(12) United States Patent
Kakehi et al.

(10) Patent No.: US 6,353,888 B1
(45) Date of Patent: Mar. 5, 2002

(54) ACCESS RIGHTS AUTHENTICATION APPARATUS

(75) Inventors: Rumiko Kakehi; Masaki Kyojima, both of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/110,318

(22) Filed: Jul. 6, 1998

(30) Foreign Application Priority Data

Jul. 7, 1997 (JP) .............................................. 9-181025

(51) Int. Cl.[7] ................................................. H04L 9/00
(52) U.S. Cl. ........................ 713/168; 713/169; 380/241; 705/65; 705/67
(58) Field of Search ................................. 713/169, 168; 705/67, 65; 380/241

(56) References Cited

U.S. PATENT DOCUMENTS 5,317,636 A * 5/1994 Vizcaino ...................... 380/23
5,590,202 A * 12/1996 Bestler et al. ................. 380/49
5,748,763 A * 5/1998 Rhoads ........................ 382/115

* cited by examiner

*Primary Examiner*—Phung M. Chung
*Assistant Examiner*—Todd Jack
(74) *Attorney, Agent, or Firm*—Oliff & Berridge, PLC

(57) ABSTRACT

A access rights authentication apparatus relieves burdens resulting from handling unique information of a large number of authentication keys and the like of users and protectors such as application authors, wherein a proof data verification module sends authentication data to a proof data generation module; proof data generation means of the proof data generation module generate proof data from the received authentication data and held user unique identifying information, and returns the proof data to the proof data verification module; the verification means of the proof data verification module verifies the proof data using the access ticket; and if the verification succeeds, program execution is permitted.

51 Claims, 23 Drawing Sheets

OPERATION OF A VERIFICATION MODULE IN FOURTH EMBODIMENT

OVERALL CONFIGURATION IN FIRST, SECOND, THIRD, FOURTH AND FIFTH EMBODIMENTS

OVERALL CONFIGURATION IN SIXTH, SEVENTH, EIGHTH, NINTH AND TENTH EMBODIMENTS

OVERALL CONFIGURATION IN ELEVENTH EMBODIMENT

FIG. 4 CONFIGURATION OF A VERIFICATION MODULE IN FIRST, SECOND, THIRD, FOURTH AND FIFTH EMBODIMENTS

CONFIGURATION OF A VERIFICATION MODULE IN SIXTH, SEVENTH, EIGHTH, NINTH AND TENTH EMBODIMENTS

CONFIGURATION OF A PROVING MODULE IN FIRST, SECOND, THIRD, FOURTH AND FIFTH EMBODIMENTS

CONFIGURATION OF A PROVING MODULE IN SIXTH, SEVENTH, EIGHTH, NINTH AND TENTH EMBODIMENTS

OPERATION OF A VERIFICATION MODULE IN FIRST EMBODIMENT

FIG. 9 OPERATION OF A VERIFICATION MODULE IN SECOND EMBODIMENT

OPERATION OF A VERIFICATION MODULE IN THIRD EMBODIMENT

OPERATION OF A VERIFICATION MODULE IN FOURTH EMBODIMENT

OPERATION OF A VERIFICATION MODULE IN FIFTH EMBODIMENT

FIG. 13 OPERATION OF A VERIFICATION MODULE IN SIXTH EMBODIMENT

OPERATION OF A VERIFICATION MODULE IN SEVENTH EMBODIMENT

FIG. 15 OPERATION OF A VERIFICATION MODULE IN EIGHTH EMBODIMENT

OPERATION OF A VERIFICATION MODULE IN NINTH EMBODIMENT

FIG. 17 OPERATION OF A VERIFICATION MODULE IN TENTH EMBODIMENT

OPERATION OF A PROVING MODULE IN FIRST EMBODIMENT

OPERATION OF A PROVING MODULE IN SECOND AND THIRD EMBODIMENTS

OPERATION OF A PROVING MODULE IN FOURTH EMBODIMENT

OPERATION OF A PROVING MODULE IN FIFTH EMBODIMENT

OPERATION OF A PROVING MODULE IN SIXTH EMBODIMENT

OPERATION OF A PROVING MODULE IN SEVENTH AND EIGHTH EMBODIMENTS

OPERATION OF A PROVING MODULE IN NINTH EMBODIMENT

OPERATION OF A PROVING MODULE IN TENTH EMBODIMENT

CONFIGURATION OF VERIFICATION MODULE IN ELEVENTH ELEMENT

OPERATION OF A VERIFICATION MODULE IN ELEVENTH EMBODIMENT

ACCESS RIGHTS AUTHENTICATION APPARATUS

BACKGROUND OF THE INVENTION

1. Field of the Invention

The present invention relates to an access rights authentication apparatus for authenticating user's access rights.

2. Description of the Prior Art

The program execution control technology is known as a prior art belonging to the same field as the present invention. With the program execution control technology, 1) a user authentication routine is embedded in an application program,
2) the routine checks that a user attempting to execute the application possesses an authorized authentication key, and
3) the program continues to execute only when the existence of the authentication key is confirmed, and in other cases, program execution is stopped.

Use of this technology permits only authorized users possessing an authentication key to execute an application program. This technology is commercially available in the software distribution business and the following products are available, for example: SentinelSuperPro (trademark) by Rainbow Technologies, Inc. and HASP (trademark) by Aladdin Knowledge Systems Ltd.

Hereinafter, the program execution control technology will be described in more detail.

1) A user to execute software possesses an authentication key as user identification information. The authentication key, which is used for encryption, is delivered to users by a software license provider, for example, a software vendor. The authentication key is carefully stored in a memory or the like within hardware to prevent duplication and is delivered to a user by use of physical means such as mail.

2) The user installs the hardware incorporating the authentication key in a personal computer or workstation of his own in a specified way. The hardware is installed in a printer board, for example.

3) The user starts the application program, and when the program execution reaches the above described user authentication routine, the program communicates with the hardware incorporating the user's authentication key. The program identifies the authentication key based on the result of the communication, and proceeds to the next step when the existence of the correct authentication key is confirmed. When the communication fails and the existence of the authentication key cannot be confirmed, the program stops itself and refrains from further execution.

The access rights authentication routine identifies an authentication key according to the following protocol, for example.

1) The access rights authentication routine generates a proper number and sends it to hardware incorporating a key.
2) The key incorporating hardware encrypts the sent number using the incorporated authentication key and sends it to the authentication routine.
3) The authentication routine determines whether or not the returned number is an expected number, namely, a number obtained by encrypting the number sent to the hardware with the correct authentication key.
4) When the returned number matches an expected number, the program continues to execute, and if not so, the program execution stops.

In this case, the communication between the application program and the authentication key incorporating hardware must be different for each execution even in the case of communication with the same hardware in the same location within the same application program. Otherwise, by once recording communication contents in normal execution processes and subsequently making responses to the application program conformably to the recording, users not possessing the correct authentication key could execute the program. Invalid execution of an application program by such reproduction of communication contents is called a replay attack.

To prevent a replay attack, usually, a random number generated newly for each communication is sent to key incorporating hardware.

Problems of the prior art result from the fact that, when creating an application program, the program author must assume in advance an authentication key possessed by a user before providing protection for the program, based on the authentication key.

In other words, the program author must predict a correct response from key incorporating hardware at program creation and create the program so that it is normally executed only when a correct response is received.

The prior art of the characteristics described above basically has two usage modes; in either case, they have a problem described below.

1) In a first method, different users' authentication keys are provided for different users. Namely, a different authentication key is provided for each user; for example, an authentication key A is assigned to a user A and an authentication key B to a user B.

In this case, the program author must create the program so that authentication routines in the program are switched appropriately for each user. In other words, since authentication keys are different for different users, the authentication routines in the program must be created so that they can identify an authentication key unique to a user using the program, therefore the program author must create as many different programs as the number of users.

When there are many target users, a task of specializing a program for each user requires unendurable efforts of a program author and there are an enormous number of user authentication keys to be managed.

2) In a second method, the program author provides a different authentication key for each application. Namely, a different authentication key is provided for each application; for example, an authentication key A is assigned to an application A and an authentication key B to an application B, and the application programs are created so that they can identify unique authentication keys.

Although this method eliminates the need to create a program individually for each user as in the case of the first method, a user must possess as many authentication keys as the number of applications to be used.

This restriction poses a problem described below to program authors and users.

As described previously, an authentication key must be carefully stored in hardware for distribution to users. Accordingly, programs themselves can be simply distributed via a network, whereas the distribution of hardware incorporating an authentication key must look to physical means such as mail. This restriction places a great burden on program authors in terms of cost, time, and packaging efforts.

The program authors, to meet users' requests, must stock a given number of pieces of hardware which are different for each application, requiring stock control costs.

The users have to put up with a troublesome task of replacing hardware each time an application to be used is changed.

When a user wants to use an application, inconveniently the user cannot use it until hardware incorporating an authentication key arrives.

A method used to reduce this burden is to in advance incorporate a plurality of authentication keys in hardware and tell a user a password for using an unused authentication key in the hardware each time permission is given to the user for the use of a new application. However, even though this method is used, it is apparent that the problem described previously is not solved in principle. Actually, for the purpose of commercial production, a system is designed so that plural pieces of hardware can be serially coupled to reduce inconveniences resulting from the above problem.

In this way, any of the two methods described above leaves a problem with convenience for program authors and users.

Taking the external characteristics of the execution control technology into account, it is conceivable that it is also applicable to mail privacy protection, control of access to files and computer resources, and control of access to other general digital contents. However, the prior art is inapplicable to these fields because of the above described problem.

SUMMARY OF THE INVENTION

The present invention has been made in consideration of the above described circumstances, and it is an object of the present invention to offer an access rights authentication apparatus which eliminates troubles occurring both in users and protectors such as application authors as the result of manipulation of unique information of a large number of authentication keys and the like, and allows user's access rights to be easily authenticated during program execution control, protection of an access right for digital contents (still images, moving pictures, voice, etc.), mail privacy protection, and control of access to files and computer resources.

According to a first aspect of the present invention, to achieve the above described purpose, there is provided a access rights authentication apparatus authenticating user's access rights by verifying the legitimacy of proof data generated to prove the access rights of the user, including: first memory means for storing authentication data; second memory means for storing user unique identifying information; third memory means for storing proof support information obtained by execution of a predetermined computation on the user unique identifying information and access rights authentication characteristic information; proof data generation means for generating proof data by performing predetermined computations on the authentication data held in the first memory means and the user unique identifying information held in the second memory means; and proof data verification means for verifying that the proof data is generated based on the user unique identifying information, including computation means for performing predetermined computations on the proof data generated by the proof data generation means and the proof support information held in the third memory means, so that the computation results of the computation means are used for verification.

In this configuration, by introducing proof support information (access tickets), access rights authentication characteristics information and user unique identifying information can be made independent of each other, and therefore both protectors and users have only to prepare one piece of unique information. Furthermore, since users need not receive an access ticket, for example, a verification method is available which distributes an application program to the users along with an access ticket so that a proof data verification module uses it during verification.

According to a second aspect of the present invention, there is provided a access rights authentication apparatus authenticating user's access rights by verifying the legitimacy of proof data generated to prove the access rights of the user, including: first memory means for storing authentication data; second memory means for storing user unique identifying information; third memory means for storing proof support information obtained by execution of a predetermined computation on the user unique identifying information and access rights authentication characteristic information; proof data generation means for generating proof data by performing predetermined computations on the authentication data held in the first memory means and the proof support information held in the third memory means; proof data verification means for verifying that the proof data is generated based on the proof support information; and computation means for performing predetermined computations on the proof data generated by the proof data generation means and the user unique identifying information held in the second memory means, the computation results of the computation means being used for verification.

In this configuration as well, access rights authentication characteristics information and user unique identifying information can be made independent of each other, and therefore protectors and users have only to prepare one piece of unique information. Moreover, since computations on the user unique identifying information are performed in the proof data verification module, the users have only to perform computations on an access ticket. For example, when the verification module is configured to have tamper-proof characteristics by dedicated hardware and holds user unique identifying information, the users can be safely authenticated only by possessing the access ticket.

According to a third aspect of the present invention, to achieve the above described purpose, there is provided a access rights authentication apparatus authenticating user's access rights, including: first memory means for storing authentication data; second memory means for storing user unique identifying information; third memory means for storing proof support information resulting from execution of a predetermined computation on the user unique identifying information and access rights authentication characteristic information; and verification means for verifying that a pair of the proof support information and the user unique identifying information corresponds correctly to the access rights authentication characteristic information from the authentication data, the user unique identifying information, and the proof support information.

In this configuration as well, access rights authentication characteristics information and user unique identifying information can be made independent of each other, and therefore protectors and users have only to prepare one piece of unique information. Moreover, since all computations are performed in the verification module, the users can be authenticated only by carrying about their unique information and an access ticket. For example, when an application program is configured on a dedicated device, the users incorporate their unique information and an access ticket into an IC card. With the dedicated device equipped with a slot for inserting an IC card, the users can be authenticated by inserting an IC card into the slot.

DETAILED DESCRIPTION OF PREFERRED EMBODIMENTS

Hereinafter, the present invention will be described in detail.

Overall Configuration

Before describing detailed individual embodiments, an outline of embodiments of the present invention will be given below.

Figure 1:
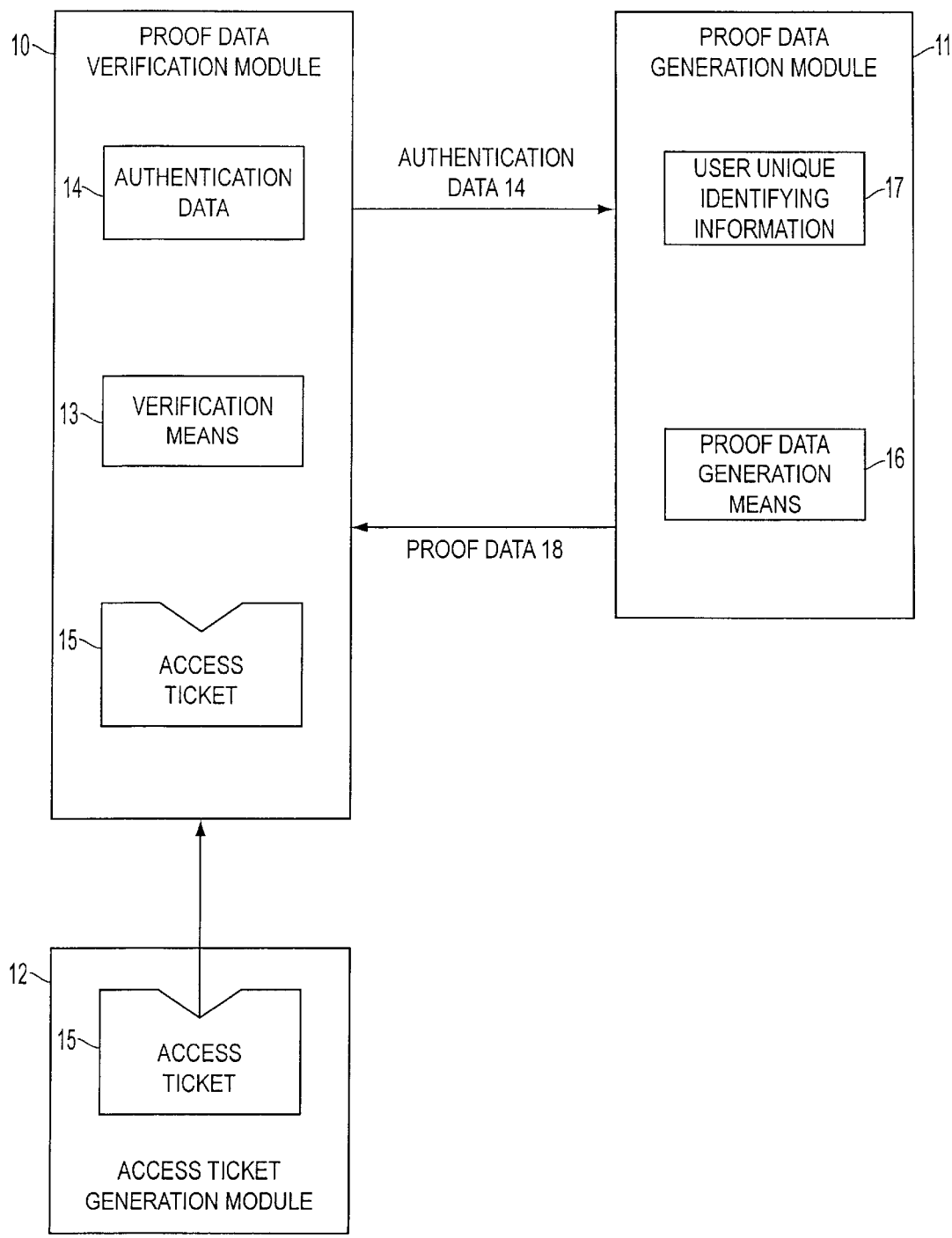
FIG. 1 is a chart showing an overall configuration in first, second, third, fourth, and fifth embodiments.
Figure 2:
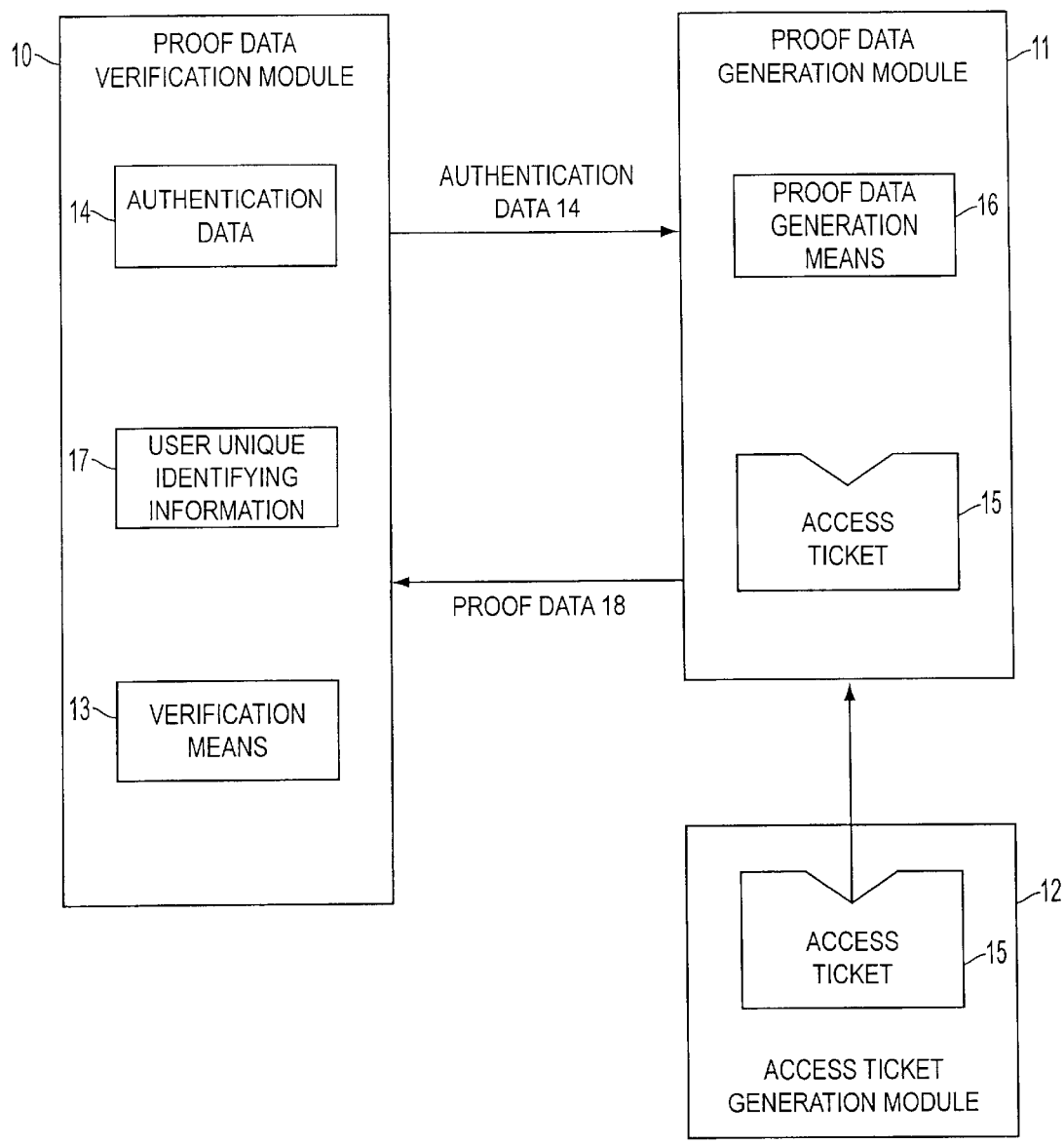
FIG. 2 is a chart showing an overall configuration in sixth, seventh, eighth, ninth, and tenth embodiments.
Figure 3:
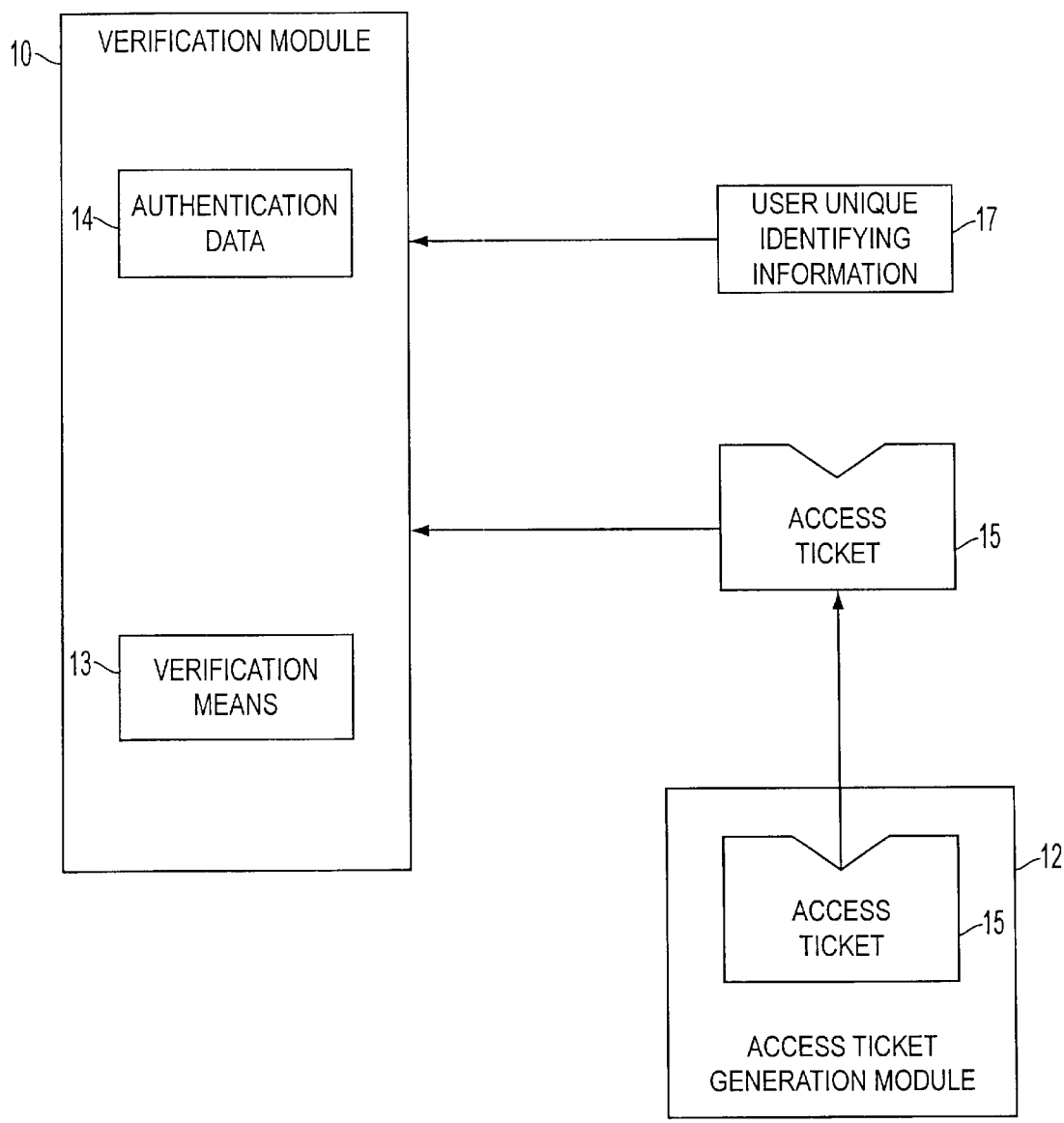
FIG. 3 is a chart showing an overall configuration in an eleventh embodiment.

First, a description will be made of the present invention at the use for the execution control of application programs operating on a user's personal computer or workstation. FIGS. 1, 2, and 3 show the configuration of three embodiments.

FIG. 1 shows the overall configuration of a first embodiment. In the first embodiment, an access ticket (proof support information) is used when proof data is verified. In FIG. 1, a program execution control module (a user authentication module) constructionally includes a proof data verification module 10 and a proof data generation module 11. The proof data verification module 10 includes verification means 13 and holds authentication data 14. The proof data verification module 10 receives access tickets (proof support information) 15 from an access ticket generation module 12. The proof data generation module 11 includes proof data generation means 16 and holds user unique identifying information 17.

The proof data verification module 10 sends authentication data 14 to the proof data generation module 11. The proof data generation means 16 of the proof data generation module 11 generates proof data 18 from the received authentication data and the user unique identifying information (unique information for identifying users) 17 held, and returns the proof data 18 to the proof data verification module 10. The verification means 13 of the proof data verification module 10 verifies the proof data 18 using the authentication data 14 and the access ticket 15. If the verification succeeds, the execution of the program is permitted.

FIG. 2 shows a second embodiment. In the second embodiment, access tickets are used to generate proof data, while user unique identifying information is used to verify proof data. In FIG. 2, locations corresponding to those in FIG. 1 are assigned corresponding reference numerals and a detailed description is omitted.

FIG. 3 shows a third embodiment. In the third embodiment, both user unique identifying information and access tickets are directly verified. In the embodiment, no proof data is generated. In FIG. 2, locations corresponding to those in FIG. 1 are assigned corresponding reference numerals and a detailed description is omitted.

Hereinafter, each of the embodiments will be described in detail.

In the embodiments of FIGS. 1, 2, and 3, if a user-made copy of unique information for identifying users (user unique identifying information 17) could be distributed, an application program could also be used by users not having a valid use right. Accordingly, to prevent even valid possessors of the user unique identifying information 17 from stealing it, hardware (IC card, board, etc.) having tamper-proof characteristics, installed in a relevant computer, can be used together. In this case, the use of portable hardware such as IC cards would be convenient for users working on a plurality of personal computers or workstations.

In the embodiment in FIG. 1, the proof data generation module 11 can be realized as a proof program on a computer used by a user. In this case, since the user unique identifying information 17 is used to generate the proof data 18, for the above reason, at least part of the above program must be protected by protection means such as IC cards.

The proof data verification module 10 is configured as part of an application program used by a relevant user. To be more specific, when the user starts the application program on a personal computer or workstation, the proof data verification module 10 described as a program in the application program is started for authentication, and only when the user is correctly authenticated, the application program can be executed. In these embodiments, user authentication is performed by communication with the proof data generation module 11, and only when the communication terminates normally, the application program can be executed.

To use the application program in which the proof data verification module 10 is embedded, a user must obtain proof support information (access ticket 15), issued to the user, corresponding to the application program. The access ticket 15 may be configured to be placed on the personal computer or workstation, or be housed in an IC card if the user unique identifying information 17 is stored in the IC card.

The proof data generation module 11 (consisting of a program on a personal computer or workstation and an IC card) performs computations based on the user unique identifying information 17, and performs communications with the proof data verification module 10 based on the computations.

As the result of the communications, authentication by the proof data verification module 10 succeeds only when a correct correspondence is taken among three items of information, namely, the user unique identifying information 17, the access ticket 15, and access rights authentication characteristic information verified by the proof data verification module 10.

Authentication does not succeed if either the user unique identifying information 17 or the access ticket 15 is lacking.

In the case of the embodiment of FIG. 1, users need not receive an access ticket. For example, the following verification method is available: an application program is distributed to users with an access ticket appended and the proof data verification module uses it during verification.

In the embodiment of FIG. 2, the proof data generation module 11 can be realized as a proof program on a computer used by a user.

The proof data verification module 10 is configured as part of an application program used by a relevant user. To be more specific, when the user starts the application program on a personal computer or workstation, the proof data verification module 10 described as a program in the application program is started for authentication, and only when the user is correctly authenticated, the application program can be executed. In these embodiments, user authentication is performed by communication with the proof data generation module 11, and only when the communication terminates normally, the application program can be executed. The user unique identifying information 17 may be sent during the communication. In this case, it must be safely sent to the verification module 10 to prevent it from leaking outside, in which case a problem may occur for the reason described previously.

To use the application program in which the proof data verification module 10 is embedded, a user must obtain an access ticket 15. The access ticket 15 may be configured to be placed on the personal computer or workstation, or be housed in an IC card if the user unique identifying information 17 is stored in the IC card.

The proof data generation module 11 performs computations based on the access ticket 15, and performs communications with the proof data verification module 10 based on the computations.

As the result of the communications, authentication by the proof data verification module 10 succeeds, also in this case, only when a correct correspondence is taken among three items of information, namely, the user unique identifying information 17, the access ticket 15, and access rights authentication characteristic information verified by the proof data verification module 10.

Authentication does not succeed if either the user unique identifying information 17 or the access ticket 15 is lacking.

In the embodiment of FIG. 2, the user has only to perform computations on the access ticket. For example, when the proof data verification module 10 is configured to have tamper-proof characteristics by dedicated hardware and holds user unique identifying information, the user can be safely authenticated only by possessing an access ticket.

In the embodiment of FIG. 3, the verification module 10 (although not exactly a proof data verification module 10, referred to using the reference numeral 10 for convenience) is configured as part of an application program used by a relevant user. To be more specific, when the user starts the application program on a personal computer or workstation, the verification module 10 described as a program in the application program is started for authentication, and only when the user is correctly authenticated, the application program can be executed. The verification module 10 obtains the user unique identifying information 17 and the access ticket 15 for authentication. In this case, for the reason described above, protection must be provided to prevent the user unique identifying information from leaking outside.

As the result of a series of computations, authentication by the verification module 10 succeeds, also in this case, only when a correct correspondence is taken among three items of information, namely, the user unique identifying information 17, the access ticket 15, and access rights authentication characteristic information verified by the verification module 10.

Authentication does not succeed if either the user unique identifying information 17 or the access ticket 15 is lacking.

In the embodiment of FIG. 3, since all computations are performed in the verification module 10, users can be authenticated only by carrying about their unique information and an access ticket. For example, when an application program is configured on a dedicated device, the users incorporate their unique information and an access ticket into an IC card. With the dedicated device equipped with a slot for inserting an IC card, the users can be authenticated by inserting an IC card into the slot.

As described above, in the individual embodiments, an access ticket 15 is issued to a specific user. That is, when the access ticket 15 is generated, the user unique identifying information 17 of a specific user is used. If the user unique identifying information 17 used to generate an access ticket 15 does not match the user unique identifying information 17 of the user of the access ticket 15, authentication will not succeed.

An access ticket is generated based on specific access rights authentication characteristic information, and the proof data verification module (a verification module in the configuration in FIG. 3) 10 is configured to authenticate the access rights authentication characteristic information. Accordingly, authentication will not succeed either if the characteristic information from which to generate the access ticket 15 and the characteristic information to be verified by the proof data verification module 10 embedded in an application program do not correspond with each other.

Alternatively, application programs may be executed on another computer connected by a network and execution results may be transferred through the network to a computer used by the user. In this case, the system is configured based on a so-called server-client model. With the above-mentioned execution control of application programs executed on a user's personal computer or workstation, communications between the proof data generation module 11 and the proof data verification module 10 are executed as so-called interprocess communications, while, with a server-client model scheme, communications between the proof data generation module 11 and the proof data verification module 10 are executed in accordance with a network protocol such as TCP/IP (transmission control protocol/Internet protocol).

The invention is also applicable to application programs configured on a dedicated device. For example, in the configuration in which the proof data generation module 11 exists, the entire proof data generation module 11 is mounted, along with use of user unique identifying information, in an IC card and an access ticket 15 obtained is also registered in the IC card. The proof data verification module 10 is mounted on the dedicated device, which is equipped with a slot for inserting an IC card, and users are authenticated by inserting an IC card of their own into the slot.

A configuration by such a dedicated device is applicable to ATM machines of banks and game machines in game arcades.

Users obtain access tickets 15 in two ways: a common center issuing the access tickets 15 generates and distributes them in accordance with an issuance request from them, and application authors individually generate access tickets with the aid of an access ticket issuance program or the access ticket generation module 12.

In such a case, the access ticket generation module 12 is managed by ticket issuers and access tickets are created and distributed separately from users' environments by valid right holders, etc.

Although the generated access tickets 15 may be delivered to users by means of portable storage media such as a floppy disk, they may be delivered through a network using electronic mail or the like because they are safe enough.

The safety of the access ticket 15 refers to the two properties described below.

1) An access ticket is a so-called signature-oriented system. Namely, only a user (to be more specific, a holder of user unique identifying information used at access ticket generation) to whom an access ticket is issued can correctly activate a proof data generation module using the access ticket. Accordingly, even if an ill-willed third person illegally obtained an access ticket of another user, the person could not use the access ticket unless he obtains the user unique identifying information of the legal user to whom the access ticket was issued.

2) An access ticket holds stricter safety. Namely, even if an ill-willed third person collected an arbitrary number of access tickets for analysis, it would be impossible to forge another access ticket based on obtained information or construct an imitation of a proof data generation module to realize authentication.

Hereinafter, a more specific configuration will be described based on embodiments.

First Embodiment

A first embodiment, which performs authentication using RSA (Rivest-Shamir-Adelman) encryption, is characterized in that access tickets are used in the proof data verification module 10.

Figure 4:
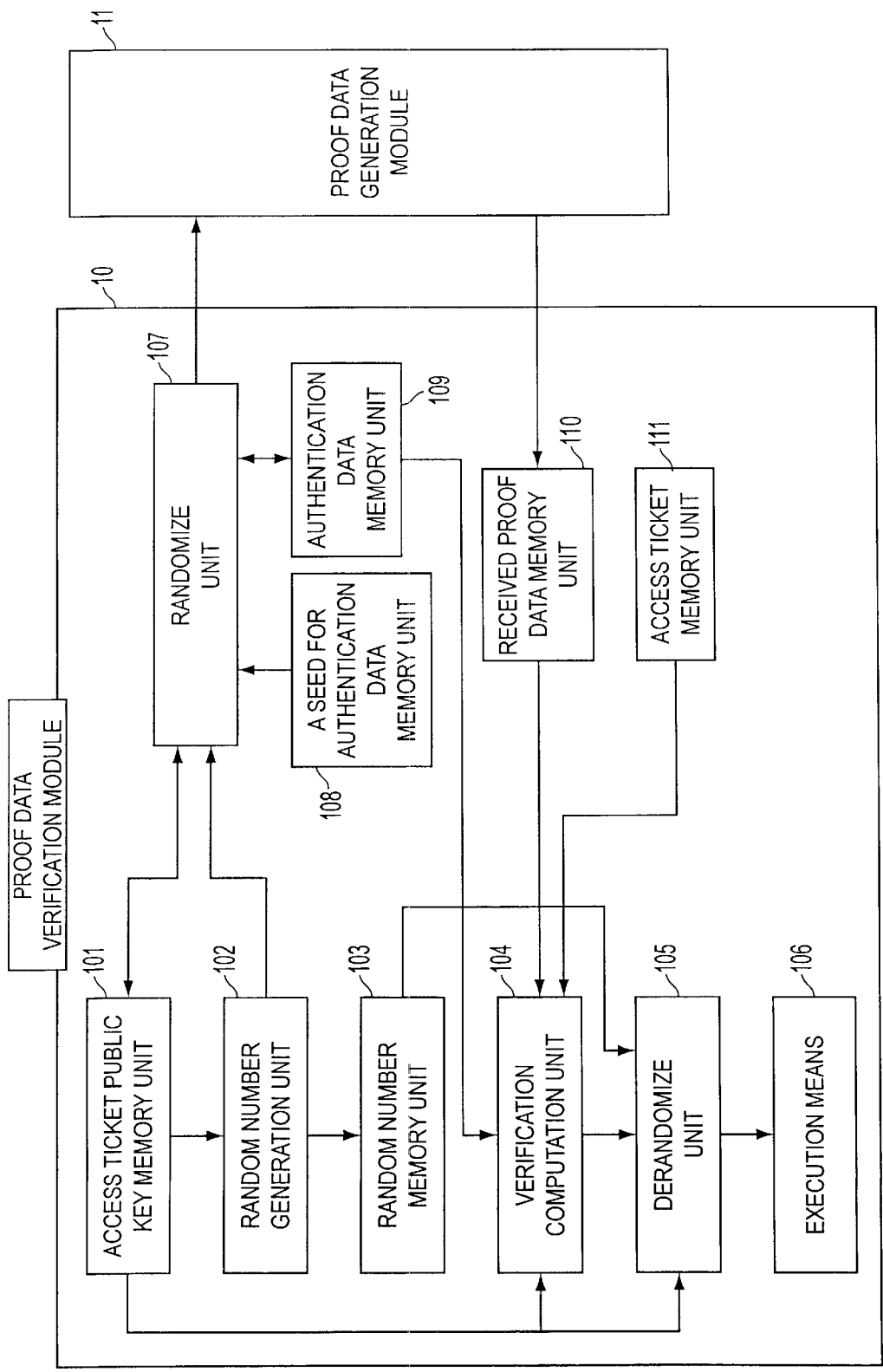
FIG. 4 is a chart showing the configuration of a proof data verification module in the first, second, third, fourth, and fifth embodiments described above.
Figure 6:
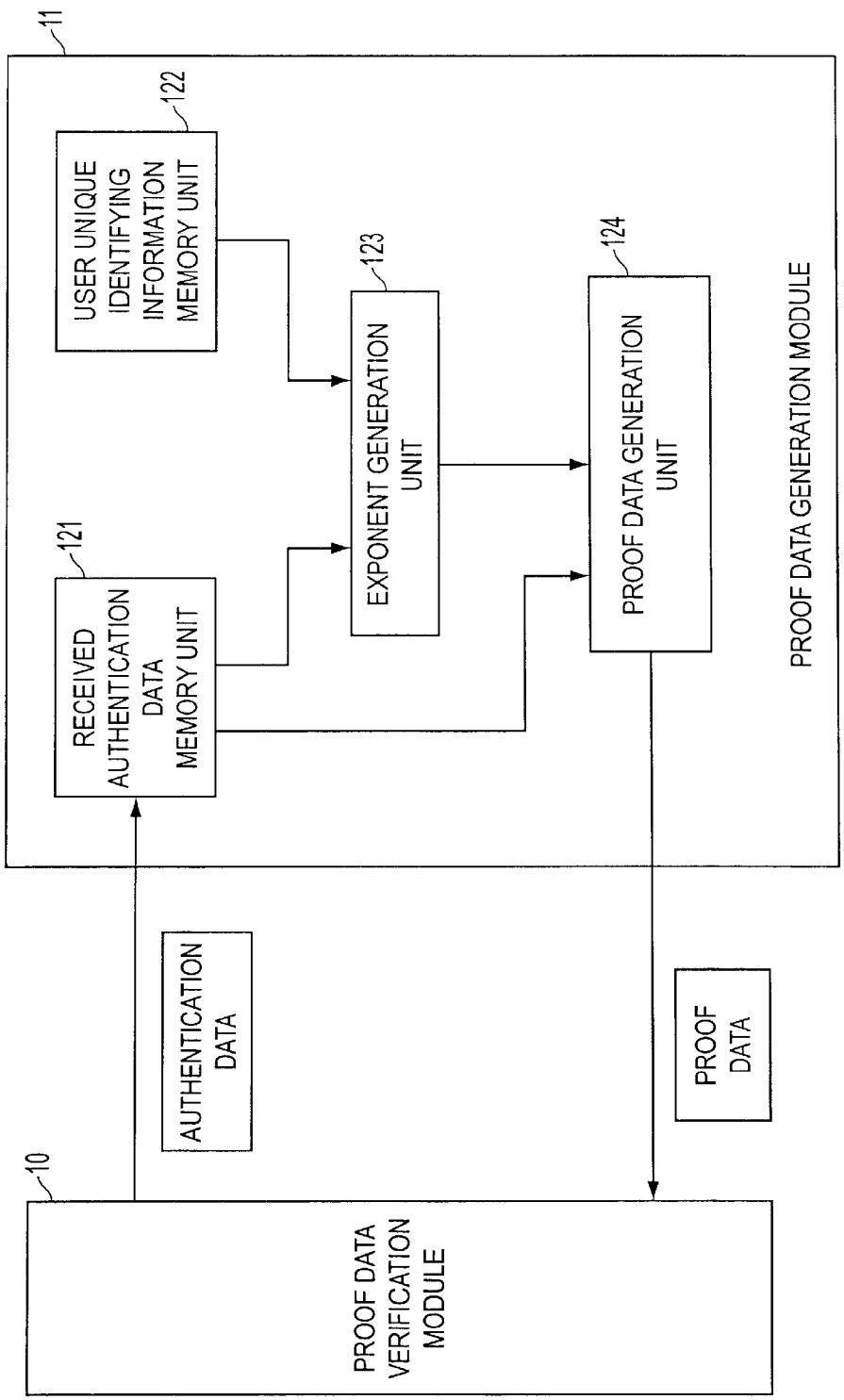
FIG. 6 is a chart showing the configuration of a proof data generation module in the first, second, third, fourth, and fifth embodiments described above.
Figure 8:
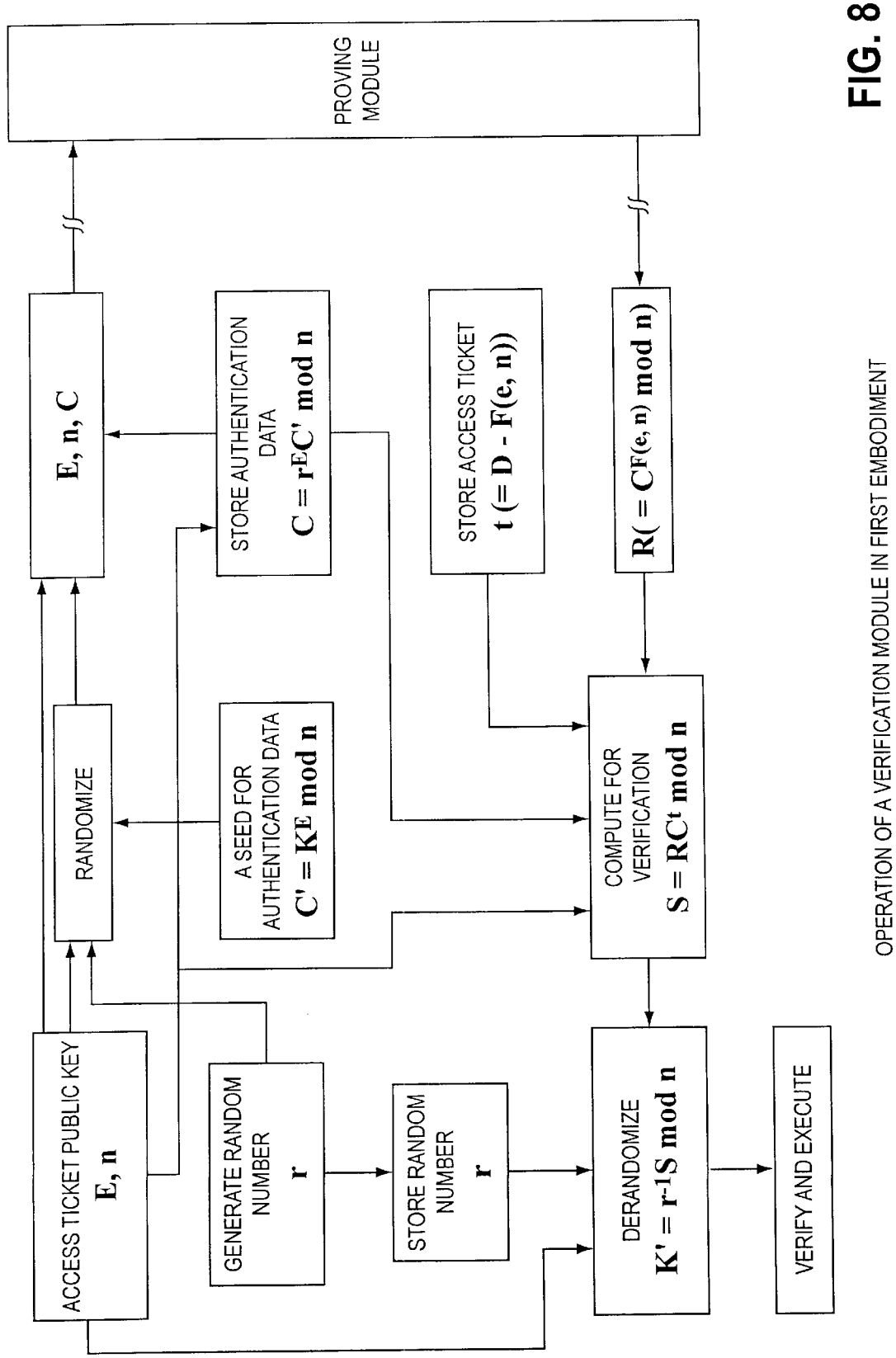
FIG. 8 is a chart showing the operation of a proof data verification module in the first embodiment described above.
Figure 18:
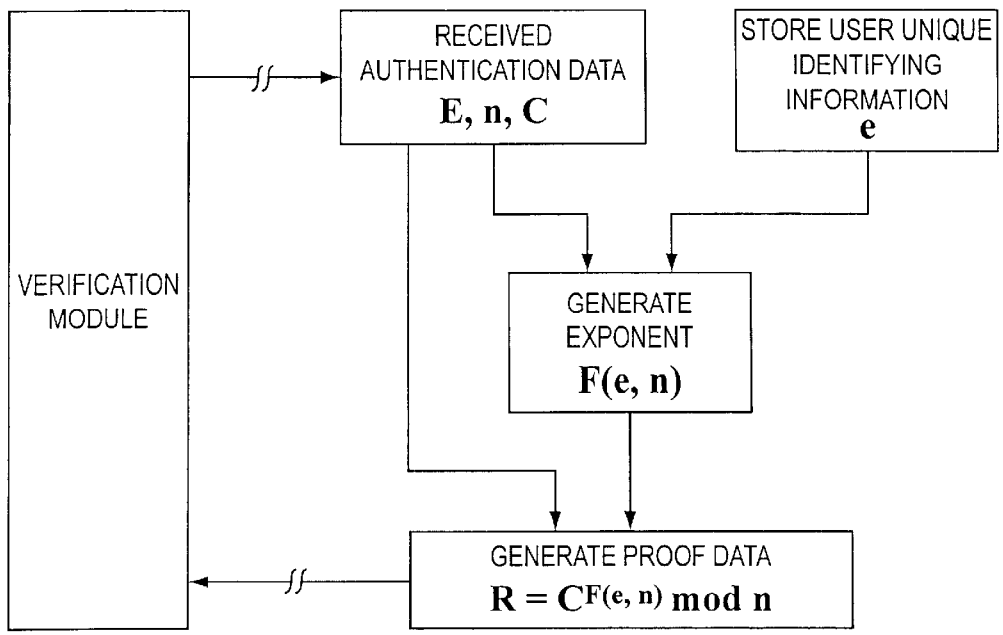
FIG. 18 is a chart showing the operation of a proof data generation module in the first embodiment described above.

An overall configuration of this embodiment is shown in FIG. 1, the configuration of the proof data verification module 10 is shown in FIG. 4, and the configuration of a proof data generation module is shown in FIG. 6. The operation of the proof data verification module 10 of this embodiment is shown in FIG. 8, and the operation of the proof data generation module 11 is shown in FIG. 18.

Figure 10:
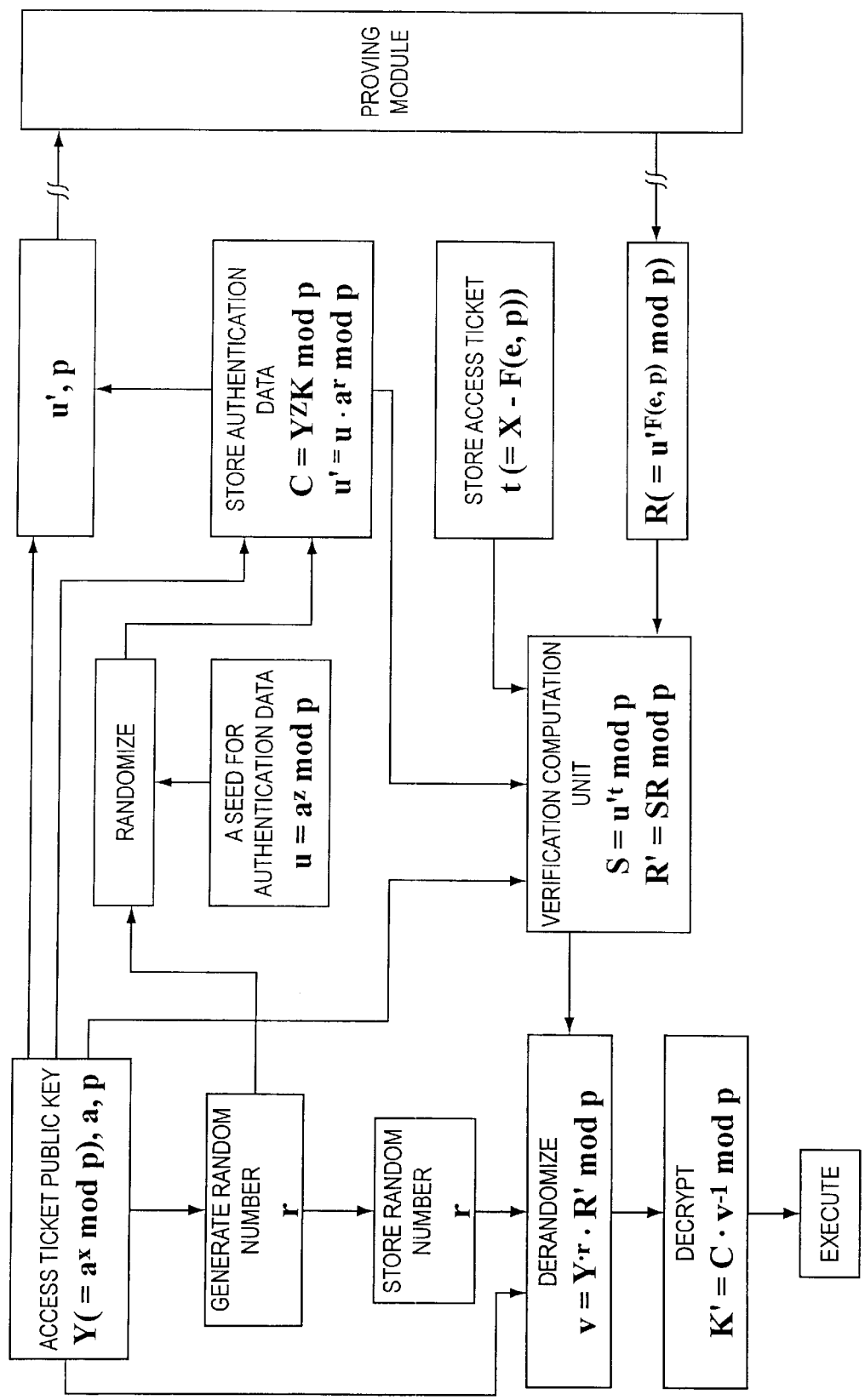
FIG. 10 is a chart showing the operation of a proof data verification module in the third embodiment described above.

In FIG. 4, the proof data verification module 10 comprises an access ticket public key memory unit 101, a random number generation unit 102, a random number memory unit 103, a verification computation unit 104, a derandomize unit 105, an execution means 106, a randomize unit 107, a seed for authentication data memory unit 108, an authentication data memory unit 109, a received proof data memory unit 110, and an access ticket memory unit 111. The operation of parts of the proof data verification module 10 and a data flow are as shown in FIG. 10. Details of the operation will be given later.

In FIG. 6, the proof data generation module 11 comprises a received authentication data memory unit 121, a user unique identifying information memory unit 122, an exponent generation unit 123, and a proof data generation unit 124. The operation of parts of the proof data generation module 11 and a data flow are as shown in FIG. 18. Details of the operation will be given later.

Next, details of authentication in this embodiment will be given.

In the first embodiment of the present invention, access rights authentication characteristic information D and public information E and n corresponding to D are defined as described below.

n is an RSA modulus, which is a product of two sufficiently large prime numbers p and q, satisfies an expression 1-1.
[Expression 1]

$$n=pq \qquad (1\text{-}1)$$

$\emptyset(n)$ is an Eulerian number of n and is computed by an expression 1-2.
[Expression 2]

$$\emptyset(n)=(p-1)(q-1) \qquad (1\text{-}2)$$

Access rights authentication characteristic information D is an RSA private key under a modulus n and satisfies an expression 1-3.
[Expression 3]

$$\gcd(D, \emptyset(n))=1 \qquad (1\text{-}3)$$

Here, gcd(x,y) denotes the greatest common divisor of two numbers x and y. The nature represented by the expression 1-3 ensures that a number E satisfying the expression 1-4 exists.

[Expression 4]

$$ED \bmod \emptyset(n)=1 \quad (1\text{-}4)$$

D is referred to as an access ticket private key and E as an access ticket public key.

An access ticket t is generated based on the expression 1-5 shown below, using an access ticket private key D, user unique identifying information e, and a modulus n.

[Expression 5]

$$t=D-F(e, n) \quad (1\text{-}5)$$

User unique identifying information e, which is a number different for each user, is used to identify a user. The function F, which has function values resistant to collision, can be defined as shown by an expression 1-6 or 1-7, using a one-way hash function h.

[Expression 6]

$$F(x,y)=h(x|y) \quad (1\text{-}6)$$

[Expression 7]

$$F(x,y,z,u,w)=h(x|y|z|u|w) \quad (1\text{-}7)$$

Here, x|y indicates a concatenation of bits of x and

A one-way hash function has the nature that it is remarkably difficult to find mutually different x and y satisfying h(x)=h(y). There are known MD2, MD4, and MD5 by RSA Data Security Inc. and SHS (Secure Hash Standard) specified by the U.S. Federal Government as examples of one-way hash functions.

In the expressions appearing in the above description, t, E, and n can be made public and the remaining D, e, p, q, $\emptyset$(n), and the function F must be made secret to other than the holders of the right to create tickets.

Hereinafter, data K encrypted is referred to as verification data and data R generated for proof by the proof data generation module 11 is referred to as proof data. Data received from the verification module 10 in order that the proof data generation module 11 generates proof data, and data used to verify decrypted values by the verification module are referred to as authentication data.

Hereinafter, the operation of this embodiment will be described.

1. The proof data verification module 10 is started by a user gaining access to the digital contents requiring authentication by a access rights authentication apparatus.

When the proof data verification module 10 is configured as part of an application program operating on a user's personal computer or workstation, the user starts the application program by a normal method such as the use of an input device such as a keyboard or a mouse. When execution of the application program reaches a program making up the proof data verification module 10, the proof data verification module 10 is started.

When the proof data verification module 10 is configured on another personal computer or workstation (called a server) connected by a network, a user starts a communication program on a personal computer or a workstation of his own and the communication program requests the server to open communications according to a predetermined procedure, whereby the proof data verification module 10 on the server is started. For example, when a user's communication program communicates with a server according to a procedure called TCP/IP (transmission protocol/Internet protocol), by associating in advance the proof data verification module 10 with a specific port of the server and setting the user's communication program so that it specifies the port to issue a TCP connection request to the server, a demon (inetd) on the server can start the proof data verification according to the TCP connection request. Such an implementation method is widely used in networks such as Internet.

The proof data verification module 10 can also be used as a dedicated device. For example, the proof data verification module can be configured as a program imprinted on ROM within the IC card reader/writer and the proof data generation module 10 can be used as a program installed in a microcontroller of an IC card. In this case, when a user inserts the IC card into the reader/writer, the proof data verification module 10 is activated.

2. The proof data verification module 10 stores authentication data C and the modulus n stored in the access ticket public key memory unit 101 into the received authentication data memory unit 121 in the proof data generation module 11. As a seed for authentication data, C' is stored in a seed for authentication data memory unit 108. Here, when verification data is selected as proper data K, the seed for authentication data C' satisfies an expression 1-8 for the data K.

[Expression 8]

$$C'=K^E \bmod n \quad (1\text{-}8)$$

If the proof data verification module 10 is configured so that it holds only C' resulting from encrypting data K instead of holding the data K in the proof data verification module 10, the risk of data K leak from the proof data verification module 10 can be avoided.

Authentication data C is generated in such a way that a random number r is generated in the random number generation unit 102 and the randomize unit 107 executes an expression 1-9 using r, E obtained from the access ticket public key memory unit 101, n, and C' obtained from the seed for authentication data memory unit 108. The generated authentication data C is stored in the received authentication data memory unit 121 in the proof data generation module 11, and is stored in the authentication data memory unit 109 of the proof data verification module 10. The generated random number r is stored in the random number memory unit 103.

[Expression 9]

$$C=r^E C' \bmod n \quad (1\text{-}9)$$

By randomizing authentication data in this way and derandomizing proof data returned by the proof data generation module 11 during verification, so-called replay attacks can be prevented. This is also true for embodiments described below.

3. The exponent generation unit 123 in the proof data generation module 11 obtains user unique identifying information e stored in the user unique identifying information memory unit 122 and a modulus n stored in the access ticket public key memory unit 101 and executes an expression 1-10.

[Expression 10]

$$F(e, n) \quad (1\text{-}10)$$

4. The proof data generation unit 124 in the proof data generation module 11 executes an expression 1-11 using data generated in the exponent generation unit 123 and obtains R.

[Expression 11]

$$R = C^{F(e,n)} \mod n \quad (1\text{-}11)$$

5. The proof data generation module returns R to the authentication data memory unit of the proof data verification module.

6. The verification computation unit 104 of the proof data verification module 10 obtains an access ticket stored in the access ticket memory unit 111 and executes an expression 1-12 under the modulus n stored in the received proof data memory unit 110 to obtain S.

[Expression 12]

$$S = RC^t \mod n \quad (1\text{-}12)$$

7. A derandomize unit in the proof data verification module 10 retrieves the random number r generated previously from the random number memory unit 103 and executes an expression 1-13.

[Expression 13]

$$K' = r^{-1} S \mod n \quad (1\text{-}13)$$

8. Only when the combination of the access ticket t used in the proof data generation module 11 with the user unique identifying information e is correct, K' obtained from the computation and the verification data K match and verification is performed correctly.

9. The obtained K' is passed to the execution means in the proof data verification module 10. The execution means performs normal processing only when a relation K'=K is satisfied.

Hereinafter, there are shown several examples of methods for verifying in the proof data verification module 10 that K and K' are identical.

[1] Directly Comparing Verification Data and a Decrypting Result

The proof data verification module 10 stores the verification data K in advance. A comparison unit in the proof data verification module 10 directly compares the verification data K and the data K' resulting from decrypting authentication data, and performs normal processing only when a relation K'=K is satisfied; if not satisfied, performs error processing such as processing discontinuation.

This configuration example has a disadvantage in safety that the verification data K itself to be verified appears in the module. For example, if the proof data verification module 10 is configured as a program operating on a user's personal computer or workstation, it is difficult but not impossible to analyze the program to steal K. If the value of K were known to users, an imitation of the proof data generation module 10 could be constructed, so that invalid access could be made by impersonating an authorized user.

[2] Using a One-way Function

To eliminate the above defect, as verification data stored by the proof data verification module 10, instead of using the verification data K itself, data h (K) obtained by applying a one-way hash function h described previously to the K is used. Because of the nature of one-way hash functions, it is remarkably difficult to find x satisfying a relation y=h(x) from data y stored in the proof data memory means.

The proof data verification module 10 has a conversion unit that returns a result of applying a one-way hash function to input data. The comparison unit compares output h (K') obtained by inputting data K' resulting from decrypting authentication data to a hash function with stored data (=h(K)).

It can be said that this method example is safer than the example in the above [1] because verification data K does not appear in the program and it is remarkably difficult to calculate K from h(K) stored in the proof data memory means.

However, with the comparison unit configured as conditional statements in the program, if the proof data verification module is a program whose configuration can be easily analyzed and tampered, there is still a weakness because the program can be tampered to skip the conditional statements.

[3] Using a Decrypted Value as a Decryption Key for Decrypting Specific Data

Data stored for verification is encrypted data and data K' resulting from decrypting authentication data is a key for decrypting the encrypted data.

The proof data verification module 10 performs decryption by using the value of the data K' as a key for decrypting cipher used to encrypt data stored for verification. As a result, only when the encrypted data has been successfully decrypted, program execution is permitted.

Also in this configuration, safety is high because a decryption key itself does not appear in a verification module.

[4] Confirming that a Decrypted Value Satisfies Specific Redundancy

The proof data verification module 10 has a redundancy verification means and sends the value of data K' resulting from authentication data to the redundancy verification means. Only when the redundancy verification means confirms that the data satisfies specific redundancy, program execution is permitted.

Examples of redundancy include decrypted data containing a repetition of a specific pattern, data at a specific position satisfying specific conditions, and data having a meaning as a specific language.

[5] Encrypting Program Codes Themselves

Encrypted data of part or all of program codes held in the proof data verification module 10 is held in the authentication data memory means as authentication data. Namely, the data K' resulting from decrypting the authentication data is part or all of the program codes.

The execution means embeds the data K' in a predetermined position in a program, and then executes the embedded program. Program execution is permitted only when the proof data generation module 11 returns correct data, that is, K' contains codes decrypted correctly.

After creating a file in which the decrypted codes are embedded in an original program, the execution means may activate the file. However, it is desirable in terms of safety to start the program after embedding the decrypted codes in the program on memory, with the program expanded on the memory.

In this configuration example, since part or all of codes indispensable to program execution are encrypted, illegal execution can be prevented even when safety is relatively small, such as when the execution means is configured as an application program operating on a user's personal computer or workstation.

[6] Using a Decrypted Value as a Decryption Key of a Program

The proof data verification module 10 holds encrypted data of part or all of program codes and the data K' resulting from decrypting authentication data is used as a decryption key required to decrypt the encrypted program codes. With this configuration, regardless of the size of code to be encrypted, the size of the data K' can be kept to a given small value, so that communication overhead can be reduced.

The proof data verification module 10 decrypts stored, encrypted program codes using the data K'. The execution unit embeds the decrypted codes in a predetermined position in the program, and then executes the embedded program. Program execution is permitted only when the proof data generation module returns correct data, that is, when the codes have been correctly decrypted by the K'.

Second Embodiment

Next, a second embodiment will be described. The second embodiment is characterized in that authentication is performed using ElGamal cipher and access tickets are used in the proof data verification module 10.

The configuration of this embodiment is the same as that in the first embodiment. Namely, the overall configuration of this embodiment is shown in FIG. 1. The configuration of the proof data verification module 10 of this embodiment is shown in FIG. 4 and the configuration of the proof data generation module 11 is shown in FIG. 6.

Figure 9:
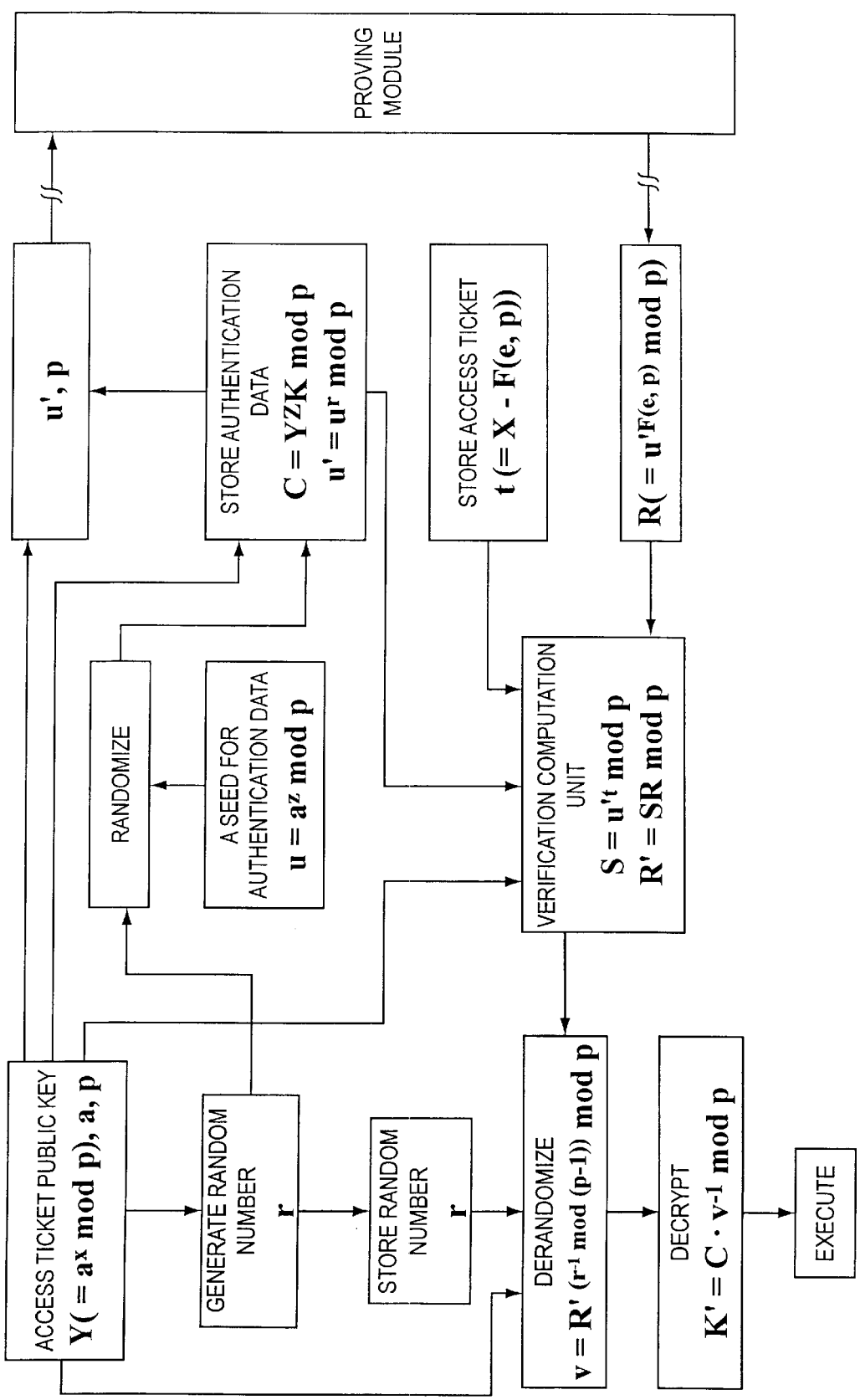
FIG. 9 is a chart showing the operation of a proof data verification module in the second embodiment described above.
Figure 19:
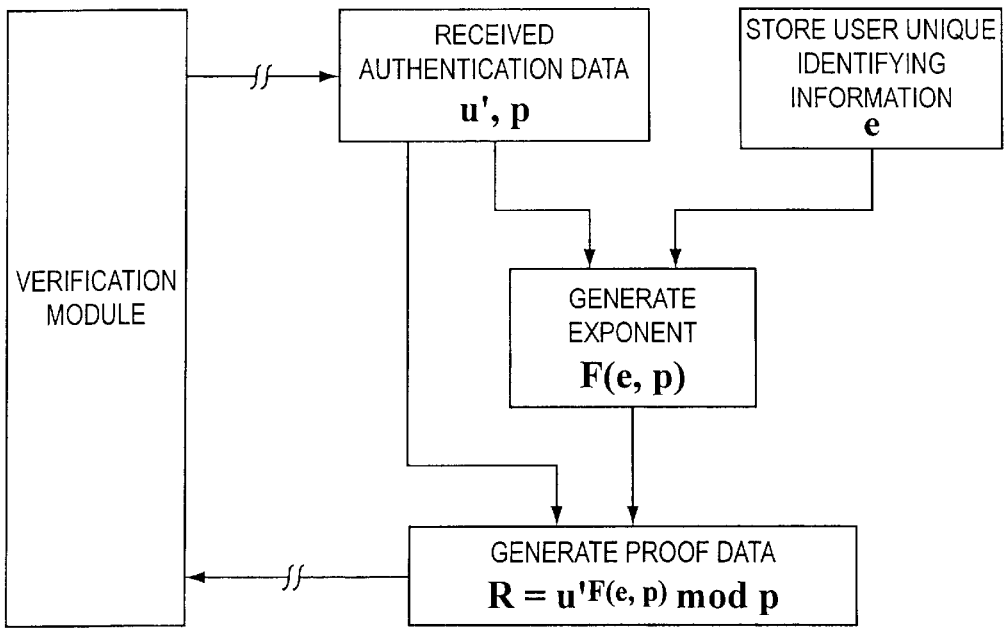
FIG. 19 is a chart showing the operation of a proof data generation module in the second and third embodiments described above.

The operation of the proof data verification module 10 of this embodiment is shown in FIG. 9 and the operation of the proof data generation module 11 is shown in FIG. 19. Before describing these operations in detail, details of authentication of this embodiment will be given below.

In the second embodiment of this invention, access rights authentication characteristic information X is a private key of ElGamal cipher under a modulus p (p is a sufficiently large prime number) and Y is a corresponding public key. Namely, an expression 2-1 is satisfied.
[Expression 14]

$$Y = a^X \bmod p \quad (2\text{-}1)$$

Here, a is the generator of a multiplicative group of an finite field of a p elements. a satisfies expressions 2-2 and 2-3.
[Expression 15]

$$a \neq 0 \quad (2\text{-}2)$$

$$\min \{X > 0 | a^X = 1 \bmod p\} = p - 1 \quad (2\text{-}3)$$

Next, to identify users, user unique identifying information e, which is a number different for each user, is defined. An access ticket t is generated based on the next expression 2-4.
[Expression 16]

$$t = X - F(e, p) \quad (2\text{-}4)$$

The function F is the same as that in the first embodiment.

Next, the operation of this embodiment will be described in detail.

1. By a user's accessing, the proof data verification module 10 is activated.

Like the first embodiment, the proof data verification module 10 can be implemented as an application program operating on a user's personal computer or workstation, a server program on a server connected via users' personal computers or workstations, or a dedicated device such as an IC card reader/writer. The same is also true for subsequent embodiments.

2. The proof data verification module 10 stores authentication data u' and a modulus p stored in the access ticket public key memory unit 101 into the received authentication data memory unit 121 in the proof data generation module 11. The seed for authentication data memory unit 108 stores u as a seed for authentication data, and the authentication data memory unit 109 stores authentication data C and u'.

u is the z-th power of the above a under a modulus p, where z is a proper random number used as an exponent. u satisfies an expression 2-5.

[Expression 17]

$$u = a^z \bmod p \quad (2\text{-}5)$$

Here, when proper data K is selected as verification data, C is the product of the z-th power of an access ticket public key Y under a modulus p and verification data K, where z is the above-described random number used as an exponent. C satisfies an expression 2-6.
[Expression 18]

$$C = Y^z K \bmod p \quad (2\text{-}6)$$

The proof data verification module 10 generates by the random number generation unit 102 a random number r which is prime to the modulus p held in the access ticket public key memory unit 101 minus 1 (p−1), and stores it in the random number memory unit 103.

Next, the randomize unit 107 obtains the data u stored in the seed for authentication data memory unit 108 and computes authentication data u' by an expression 2-7.
[Expression 19]

$$u' = u^r \bmod p \quad (2\text{-}7)$$

3. The exponent generation unit 123 in the proof data generation module 11 obtains the user unique identifying information e stored in the user unique identifying information memory unit 122 and the modulus p stored in the received authentication data memory unit 121, and executes an expression 2-8.
[Expression 20]

$$F(e, p) \quad (2\text{-}8)$$

4. The proof data generation unit 124 in the proof data generation module 11 executes an expression 2-9 using the data generated by the exponent generation unit 123, and obtains R.
[Expression 21]

$$R = u'^{F(e,p)} \bmod p \quad (2\text{-}9)$$

5. The proof data generation module 124 returns R to the received proof data memory unit 110 of the proof data verification module 10.

6. The verification computation unit 104 in the proof data verification module 10 obtains the modulus p, the seed for authentication data u', and the access ticket t from the access ticket public key memory unit 101, the authentication data memory unit 109, and the access ticket memory unit 111, respectively, and executes an expression 2-10.
[Expression 22]

$$S = u'^t \bmod p \quad (2\text{-}10)$$

7. Further, the verification computation unit 104 in the proof data verification module 10 obtains the proof data R stored in the received proof data memory unit 110, and executes an expression 2-11 to obtain R'.
[Expression 23]

$$R' = SR \bmod p \quad (2\text{-}11)$$

8. The derandomize unit 105 in the proof data verification module 10 retrieves the random number r generated previously from the random number memory unit 103 and executes an expression 2-12.

[Expression 24]

$$v=R'^A \mod p, \text{ where } A=(r^{-1} \mod (p-1))  \quad (2\text{-}12)$$

Next, an expression 2-13 is executed using v obtained from the computation and C stored in the authentication data memory unit 109.

[Expression 25]

$$K'=C \cdot v^{-1} \mod p \quad (2\text{-}13)$$

9. Only when the combination of the access ticket t used in the proof data verification module 10 and the user unique identifying information e is correct, K' obtained from the computation and the verification data K match and verification is performed correctly.

Third Embodiment

Next, a third embodiment of the invention will be described. This embodiment is a variation of the second embodiment. This embodiment is the same as the second embodiment with respect to the method for forming ElGamal public key cipher, the method for generating an access ticket t, a seed for authentication data u, and authentication data C, and the conditions of t, u, and C to be satisfied.

The overall configuration of this embodiment is shown in FIG. 1, the configuration of the proof data verification module 10 is shown in FIG. 4, and the configuration of the proof data generation module 11 is shown in FIG. 6. The operation of a verification module of this embodiment is shown in FIG. 10 and the operation of a proof data generation module is shown in FIG. 19.

Hereinafter, the operation of this embodiment will be described.

1. By a user's accessing, the proof data verification module 10 is activated.

2. The proof data verification module 10 stores authentication data u' and the modulus p stored in the access ticket public key memory unit 101 into the received authentication data memory unit 121 in the proof data generation module 11. The seed for authentication data memory unit 108 stores u as a seed for authentication data, and the authentication data memory unit 109 stores authentication data C.

The proof data verification module 10 generates a random number r by the random number generation unit 102 and stores it in the random number memory unit 103.

Next, the randomize unit 107 obtains the data u stored in the seed for authentication data memory unit 108 and computes authentication data u' by an expression 3-1.

[Expression 26]

$$u'=u \cdot a^r \mod p \quad (3\text{-}1)$$

3. The exponent generation unit 123 in the proof data generation module 11 obtains the user unique identifying information e stored in the user unique identifying information memory unit 122 and the modulus p stored in the received authentication data memory unit 121, and executes an expression 3-2.

[Expression 27]

$$F(e, p) \quad (3\text{-}2)$$

4. The proof data generation unit 124 in the proof data generation module 11 executes an expression 3-3 using the data generated by the exponent generation unit 123, and obtains R.

[Expression 28]

$$R=u'^{F(e,p)} \mod p \quad (3\text{-}3)$$

5. The proof data generation module 11 returns R to the received proof data memory unit 110 of the proof data verification module 1.

6. The verification computation unit 104 in the proof data verification module 10 obtains the modulus p, the authentication data u', and the access ticket t from the access ticket public key memory unit 101, the seed for authentication data memory unit 109, and the access ticket memory unit 111, respectively, and executes an expression 3-4.

[Expression 29]

$$S=u'^t \mod p \quad (3\text{-}4)$$

7. Further, the verification computation unit 104 in the proof data verification module 10 obtains the proof data R stored in the received proof data memory unit 110, and executes an expression 3-5 to obtain R'.

[Expression 30]

$$R'=SR \mod p \quad (3\text{-}5)$$

8. The derandomize unit 105 in the proof data verification module 10 retrieves the random number r generated previously from the random number memory unit 103 and executes an expression 3-6.

[Expression 31]

$$v=Y^{-r} \cdot R' \mod p \quad (3\text{-}6)$$

Next, an expression 3-7 is executed using v obtained from the computation and C stored in the authentication data memory unit 109.

[Expression 32]

$$K'=C \cdot^{-1} \mod p \quad (3\text{-}7)$$

9. Only when the combination of the access ticket t used in the proof data verification module 10 and the user unique identifying information e is correct, K' obtained from the computation and the verification data K match and verification is performed correctly.

Fourth Embodiment

Next, a fourth embodiment of the invention will be described. This embodiment is also a variation of the second embodiment. This embodiment is the same as the second embodiment with respect to the method for forming ElGamal public key cipher, the method for generating an access ticket t, a seed for authentication data u, and authentication data C, and the conditions of t, u, and C to be satisfied.

Figure 11:
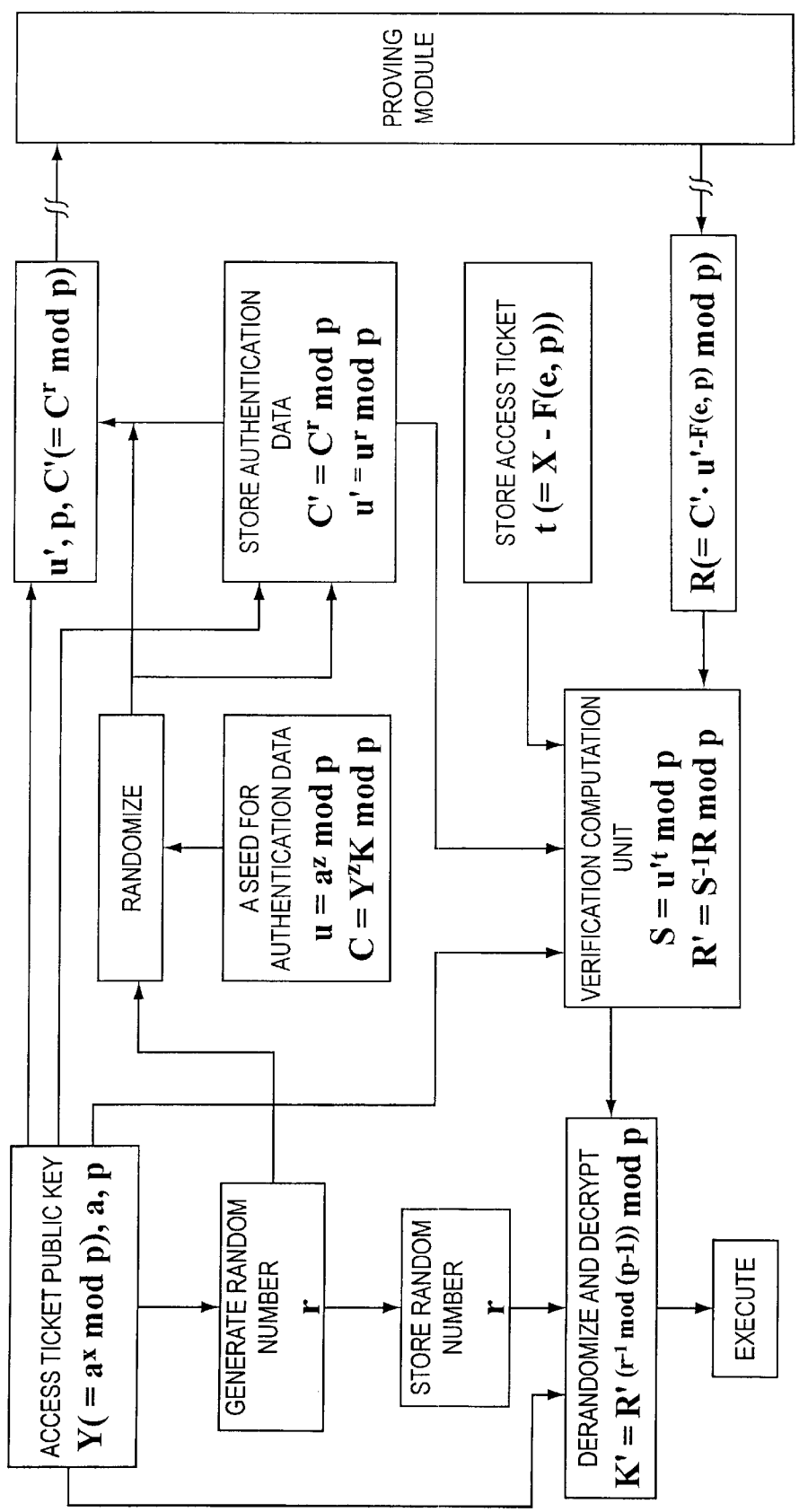
FIG. 11 is a chart showing the operation of a proof data verification module in the fourth embodiment described above.
Figure 20:
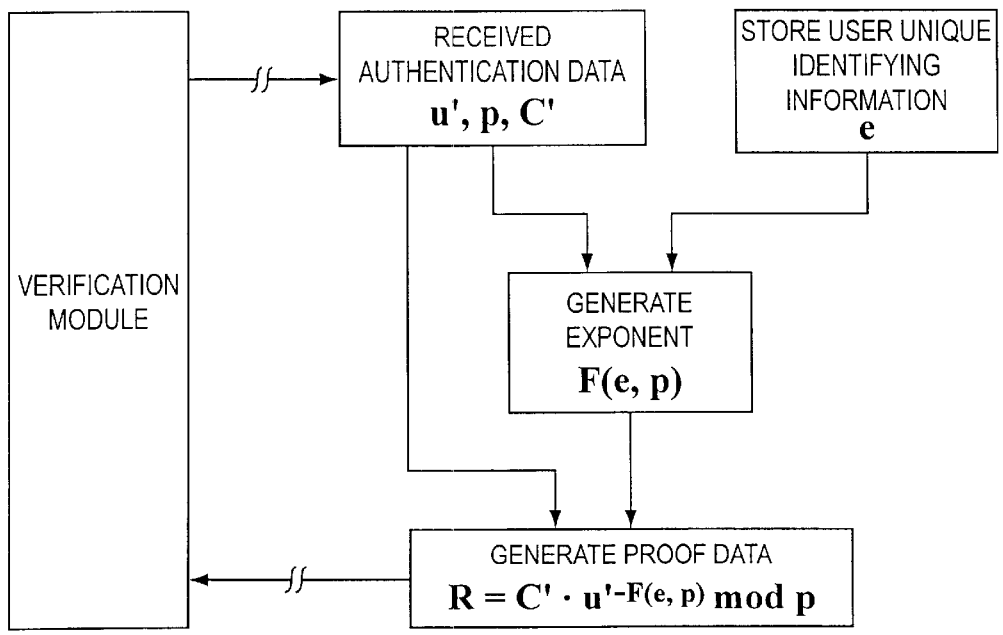
FIG. 20 is a chart showing the operation of a proof data generation module in the fourth embodiment described above.

The overall configuration of this embodiment is shown in FIG. 1. The configuration of the proof data verification module 10 is shown in FIG. 4, and the configuration of the proof data generation module 11 is shown in FIG. 6. The operation of the proof data verification module 10 of this embodiment is shown in FIG. 11 and the operation of the proof data generation module 11 is shown in FIG. 20.

Hereinafter, the operation of this embodiment will be described.

1. By a user's accessing, the proof data verification module 10 is activated.

2. The proof data verification module 10 stores authentication data u' and C', and the modulus p stored in the access ticket public key memory unit 101 in the received authentication data memory unit 121 in the proof data generation module 11. The seed for authentication data memory unit 108 stores u and C as a seed for authentication data.

The proof data verification module 10 generates by the random number generation unit 102 a random number r which is prime to the modulus p held in the access ticket public key memory unit 101 minus 1 (p−1), and stores it in the random number memory unit 103.

Next, the randomize unit 107 obtains the data u stored in the seed for authentication data memory unit 108 and computes authentication data u' by an expression 4-1.
[Expression 33]

$$u'=u^r \bmod p \qquad (4\text{-}1)$$

Further, the randomize unit 107 obtains the data C stored in the seed for authentication data memory unit 108 and executes an expression 4-2.
[Expression 34]

$$C'=C^r \bmod p \qquad (4\text{-}2)$$

3. The exponent generation unit 123 in the proof data generation module 11 obtains the user unique identifying information e stored in the user unique identifying information memory unit 122 and the modulus p stored in the received authentication data memory unit 121, and executes an expression 4-3.
[Expression 35]

$$F(e, p) \qquad (4\text{-}3)$$

4. The proof data generation unit 124 in the proof data generation module 11 executes an expression 4-4 using the data generated by the exponent generation unit 123, and obtains R.
[Expression 36]

$$R=C' \cdot u'^{-F(e,p)} \bmod p \qquad (4\text{-}4)$$

5. The proof data generation module 11 returns R to the received proof data memory unit 110 of the proof data verification module 10.

6. The verification computation unit 104 in the proof data verification module 10 obtains the modulus p, the authentication data u', and the access ticket t from the access ticket public key memory unit 101, the authentication data memory unit 109, and the access ticket memory unit 111, respectively, and executes an expression 4-5.
[Expression 37]

$$S=u'^t \bmod p \qquad (4\text{-}5)$$

7. Further, the verification computation unit 104 in the proof data verification module 10 obtains the proof data R stored in the received proof data memory unit 110, and executes an expression 4-6 to obtain R'.
[Expression 38]

$$R'=S^{-1}R \bmod p \qquad (4\text{-}6)$$

8. The derandomize unit 105 in the proof data verification module 10 retrieves the random number r generated previously from the random number memory unit 103 and executes an expression 4-7.
[Expression 39]

$$K'=R'^A \bmod p, \text{ where } A=(r^{-1} \bmod(p-1))$$

9. Only when the combination of the access ticket t used in the proof data verification module 10 with the user unique identifying information e is correct, K' obtained from the computation and the verification data K match and verification is performed correctly.

Fifth Embodiment

Next, a fifth embodiment of the invention will be described. This embodiment is also a variation of the second embodiment. This embodiment is the same as the second embodiment with respect to the method for forming ElGamal public key cipher, the method for generating an access ticket t, a seed for authentication data u, and authentication data C, and the conditions of t, u, and C to be satisfied.

Figure 12:
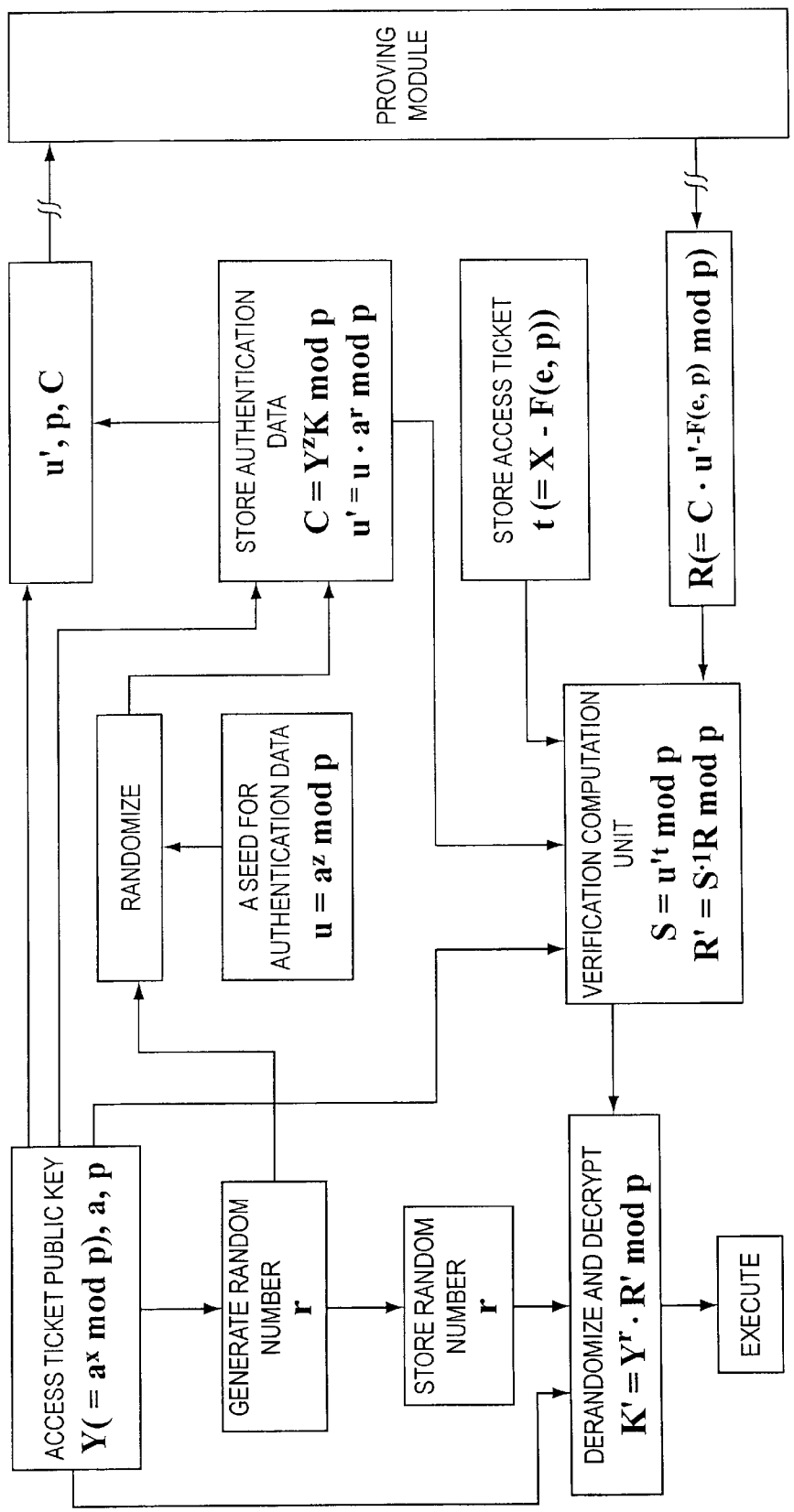
FIG. 12 is a chart showing the operation of a proof data verification module in the fifth embodiment described above.
Figure 21:
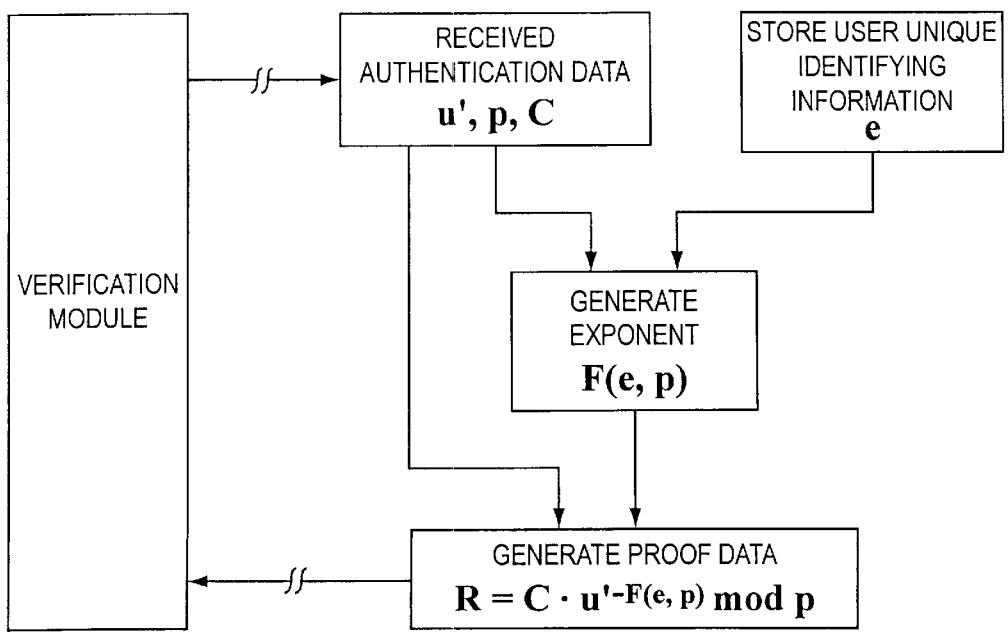
FIG. 21 is a chart showing the operation of a proof data generation module in the fifth embodiment described above.

The overall configuration of this embodiment is shown in FIG. 1, the configuration of the proof data verification module 10 is shown in FIG. 4, and the configuration of the proof data generation module 11 is shown in FIG. 6. The operation of the proof data verification module 10 of this embodiment is shown in FIG. 12 and the operation of the proof data generation module 11 is shown in FIG. 21.

Hereinafter, the operation of this embodiment will be described.

1. By a user's accessing, the proof data verification module 10 is activated.

2. The proof data verification module 10 stores authentication data u' and C, and the modulus p stored in the access ticket public key memory unit 101 into the received authentication data memory unit 121 in the proof data generation module 11. The seed for authentication data memory unit 108 stores u as a seed for authentication data, and the authentication data memory unit 109 stores authentication data C and u'.

The proof data verification module 10 generates a random number r by the random number generation unit 102 and stores it in the random number memory unit 103.

Next, the randomize unit 107 obtains the data u stored in the seed for authentication data memory unit 108 and computes authentication data u' by an expression 5-1.
[Expression 40]

$$u'=u \cdot \underline{a}^r \bmod p \qquad (5\text{-}1)$$

3. The exponent generation unit 123 in the proof data generation module 11 obtains the user unique identifying information e stored in the user unique identifying information memory unit 122 and the modulus p stored in the received authentication data memory unit 121, and executes an expression 5-2.
[Expression 41]

$$F(e, p) \qquad (5\text{-}2)$$

4. The proof data generation unit 124 in the proof data generation module 11 executes an expression 5-3 using the data generated by the exponent generation unit 123, and obtains R.
[Expression 42]

$$R=C \cdot u'^{-F(e,p)} \bmod p \qquad (5\text{-}3)$$

5. The proof data generation module 11 returns R to the received proof data memory unit 110 of the proof data verification module 10.

6. The verification computation unit 104 in the proof data verification module 10 obtains the modulus p, the authentication data u', and the access ticket t from the access ticket public key memory unit 101, the seed for authentication data memory unit 109, and the access ticket memory unit 111, respectively, and executes an expression 5-4.

[Expression 43]

$$S = u^{u'} \bmod p \quad (5\text{-}4)$$

7. Further, the verification computation unit 104 in the proof data verification module 10 obtains the proof data R stored in the received proof data memory unit 110, and executes an expression 5-5 to obtain R'.
[Expression 44]

$$R' = S^{-1} R \bmod p \quad (5\text{-}5)$$

8. The derandomize unit 105 in the proof data verification module 10 retrieves the random number r generated previously from the random number memory unit 103 and executes an expression 5-6.
[Expression 45]

$$K' = Y'^r \cdot R' \bmod p \quad (5\text{-}6)$$

9. Only when the combination of the access ticket t used in the proof data verification module 10 and the user unique identifying information e is correct, K' obtained from the computation and the verification data K match and verification is performed correctly.

Sixth Embodiment

Next, a sixth embodiment of this invention will be described. In this embodiment, RSA encryption is used for authentication, an access ticket is used in proof data generation, and user unique identifying information is used in proof data verification.

In the sixth embodiment of the invention, access rights authentication characteristic information D and the public information E and n corresponding to D, a function F, and user unique identifying information e are afforded in the same way as in the first embodiment. As in the first embodiment, D is referred to as an access ticket private key and E as an access ticket public key.

Figure 5:
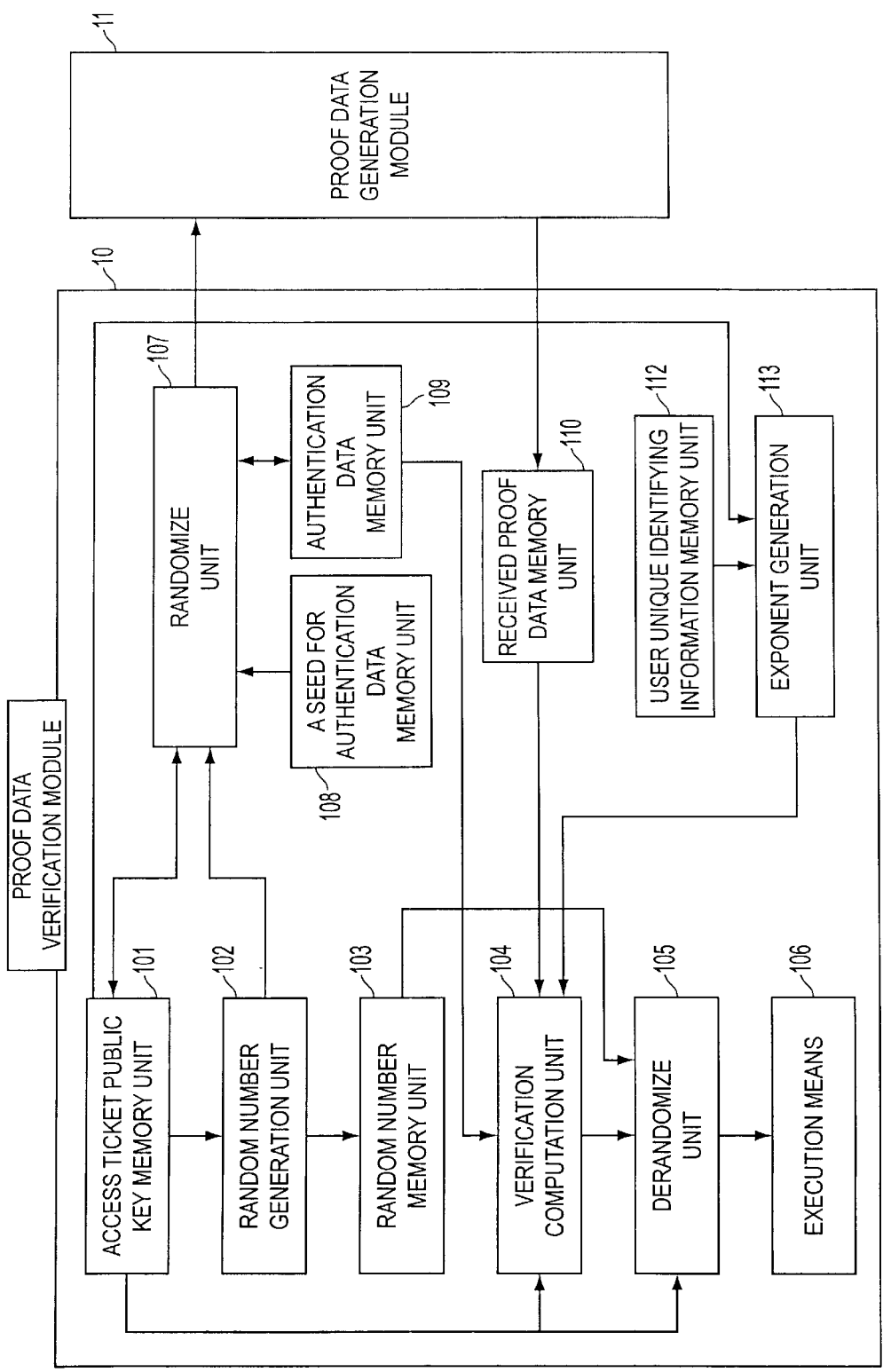
FIG. 5 is a chart showing the configuration of a proof data verification module in the sixth, seventh, eighth, ninth, and tenth embodiments described above.
Figure 7:
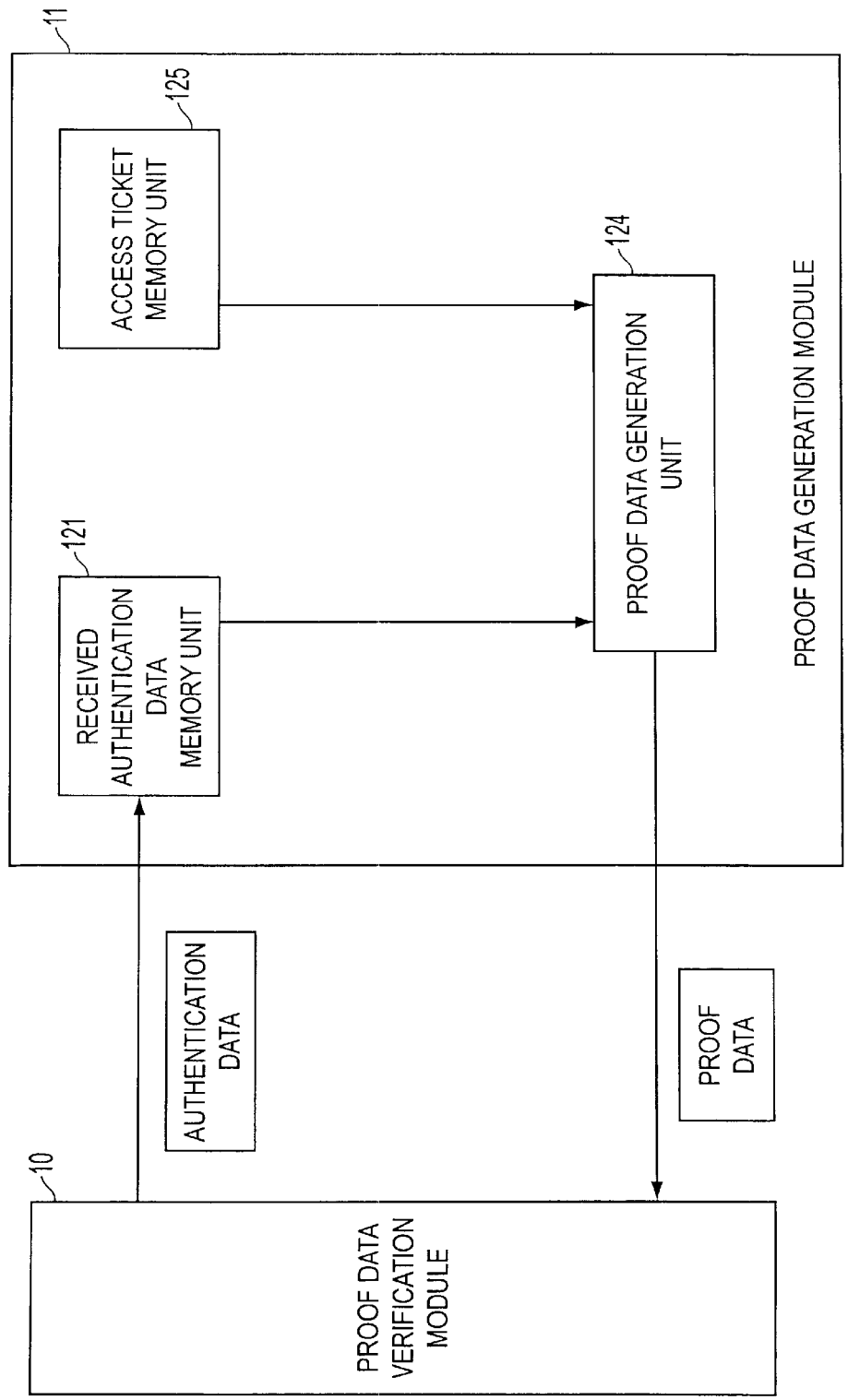
FIG. 7 is a chart showing the configuration of a proof data generation module in the sixth, seventh, eighth, ninth, and tenth embodiments described above.
Figure 13:
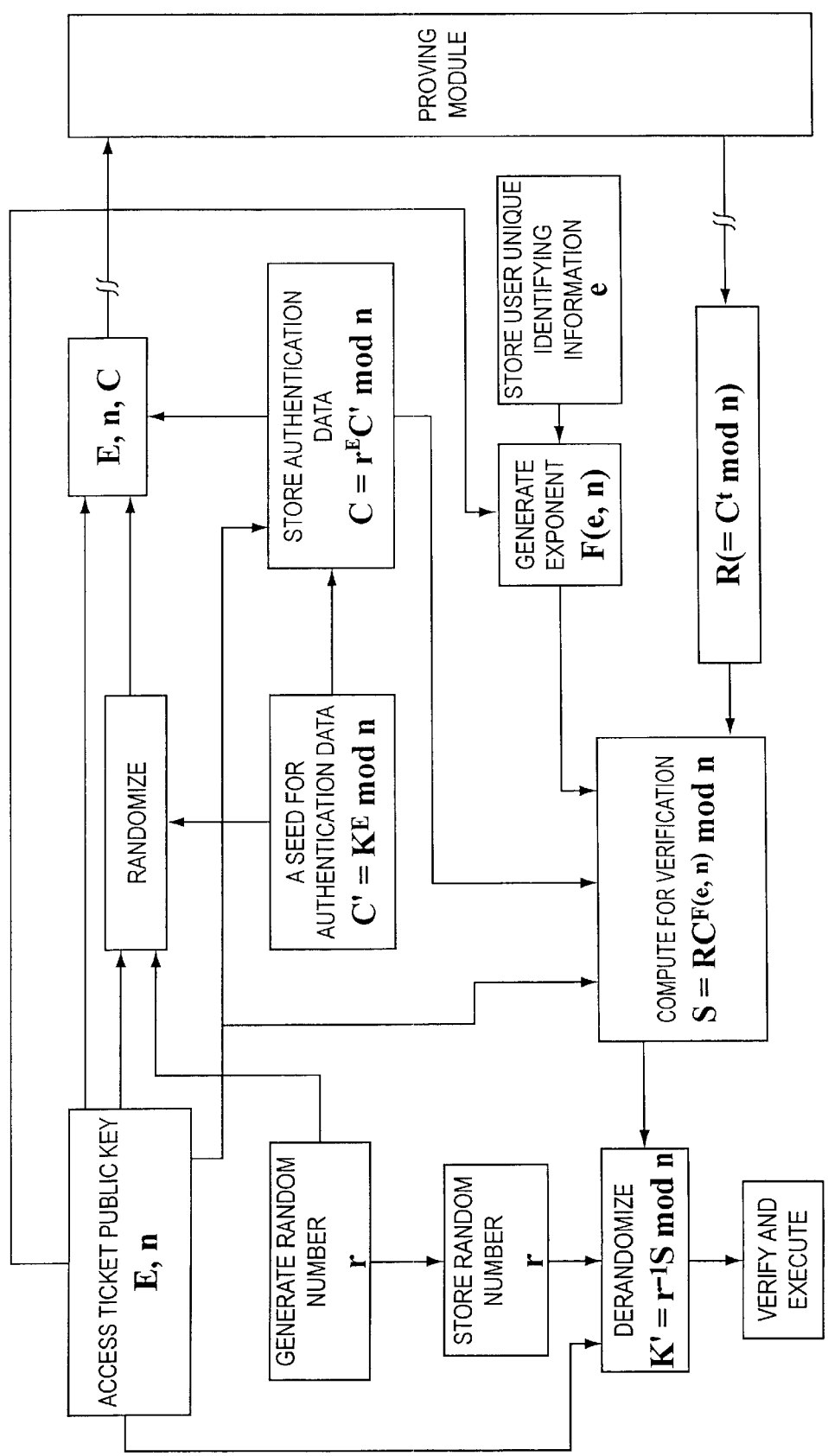
FIG. 13 is a chart showing the operation of a proof data verification module in the sixth embodiment described above.
Figure 22:
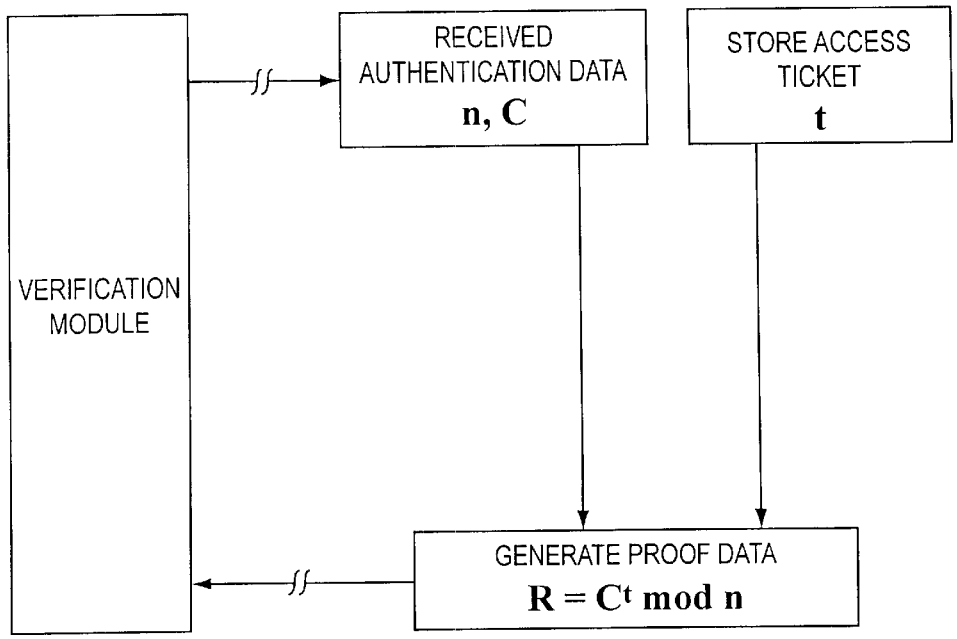
FIG. 22 is a chart showing the operation of a proof data generation module in the sixth embodiment described above.

The overall configuration of this embodiment is shown in FIG. 2. The configuration of the proof data verification module 10 is shown in FIG. 5, and the configuration of the proof data generation module 11 is shown in FIG. 7. The operation of the proof data verification module 10 of this embodiment is shown in FIG. 13 and the operation of the proof data generation module 11 is shown in FIG. 22.

In FIG. 5, the proof data verification module 10 comprises an access ticket public key memory unit 101, a random number generation unit 102, a random number memory unit 103, a verification computation unit 104, a derandomize unit 105, an execution means 106, a randomize unit 107, a seed for authentication data memory unit 108, an authentication data memory unit 109, a received proof data memory unit 110, a user unique identifying information unit 112, and an exponent generation unit 113.

In FIG. 7, the proof data generation module 11 comprises an received authentication data memory unit 121, a user unique identifying information memory unit 122, a proof data generation unit 124, and an access ticket memory unit 125.

An access ticket t is generated based on an expression 6-1 shown below, using the access ticket private key D, the user unique identifying information e, and the modulus n.
[Expression 46]

$$t = D - F(e, n) \quad (6\text{-}1)$$

Next, the operation of this embodiment will be described.
1. By a user's accessing, the proof data verification module 10 is activated.
2. The proof data verification module 10 store the authentication data C and the modulus n stored in the access ticket public key memory unit 101 into the received authentication data memory unit 121 in the proof data generation module 11. The seed for authentication data memory unit 108 stores C' as a seed for authentication data. Here, when proper data K is selected as verification data, the seed for authentication data C' satisfies an expression 6-2 for the data K.
[Expression 47]

$$C' = K^E \bmod n \quad (6\text{-}2)$$

The random number generation unit 102 of the proof data verification module 10 generates a random number r and holds it in the random number memory unit 103. The authentication data C is generated by executing an expression 6-3 in the randomize unit 107 using E and n obtained from the access ticket public memory unit 101 and C' obtained from the seed for authentication data memory unit 108. The generated authentication data C is stored in the received authentication data memory unit 121 in the proof data generation module 11 and stored in the authentication data memory unit 109 of the proof data verification module 11.
[Expression 48]

$$C = r^E C' \bmod n \quad (6\text{-}3)$$

3. The proof data generation unit 124 in the proof data generation module 11 obtains the access ticket t stored in the access ticket memory unit 125 and executes an expression shown below to obtain R under the modulus n stored in the received authentication data memory unit 121.
[Expression 49]

$$R = C^t \bmod n \quad (6\text{-}4)$$

4. The proof data generation module 11 returns R to the received proof data memory unit 110 of the proof data verification module 10.
5. The exponent generation unit 113 in the proof data verification module 10 obtains the user unique identifying information e stored in the user unique identifying information memory unit 112 and the modulus n stored in the access ticket public key memory unit 101, and executes an expression 6-5.
[Expression 50]

$$F(e, n) \quad (6\text{-}5)$$

6. The verification computation unit 104 in the proof data verification module 10 executes an expression 66 using data generated in the exponent generation unit 113, and obtains S.
[Expression 51]

$$S = RC^{F(e,n)} \bmod n \quad (6\text{-}6)$$

7. The derandomize unit 105 in the proof data verification module 10 retrieves the random number r generated previously from the random number memory unit 103, and executes an expression 6-7.
[Expression 52]

$$K' = r^{-1} S \bmod n \quad (6\text{-}7)$$

8. Only when the combination of the access ticket t used in the proof data generation module 11 with the user unique identifying information e is correct, K' obtained from the computation and the verification data K match and verification is performed correctly.

Seventh Embodiment

Next, a seventh embodiment of this invention will be described. In this embodiment, ElGamal encryption is used for authentication. Like the sixth embodiment, an access ticket is used at proof data generation, and user unique identifying information is used at proof data verification.

This embodiment is the same as the second embodiment with respect to the method for forming ElGamal public key cipher, the method for generating an access ticket t, a seed for authentication data u, and authentication data C, and the conditions of t, u, and C to be satisfied.

Figure 14:
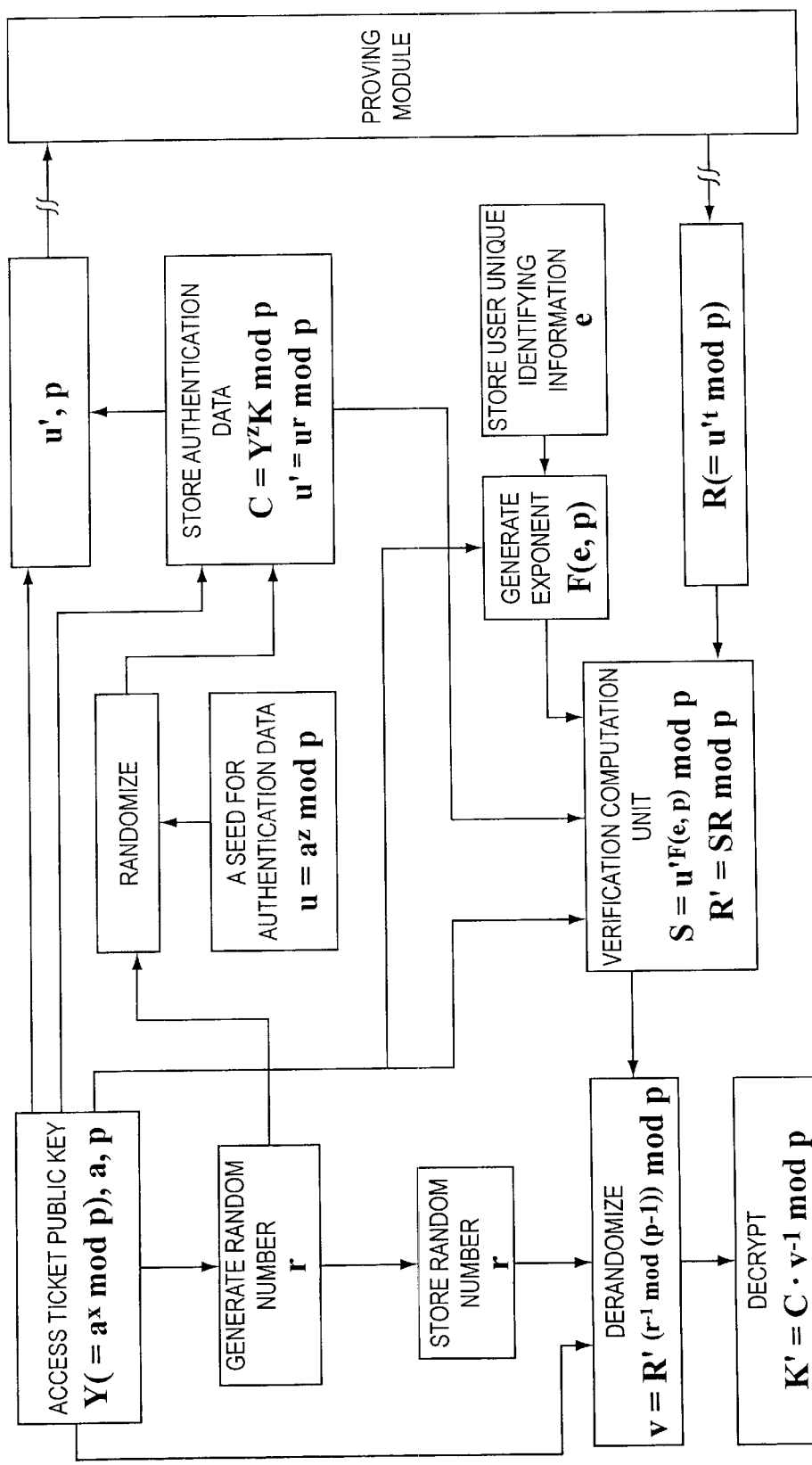
FIG. 14 is a chart showing the operation of a proof data verification module in the seventh embodiment described above.
Figure 23:
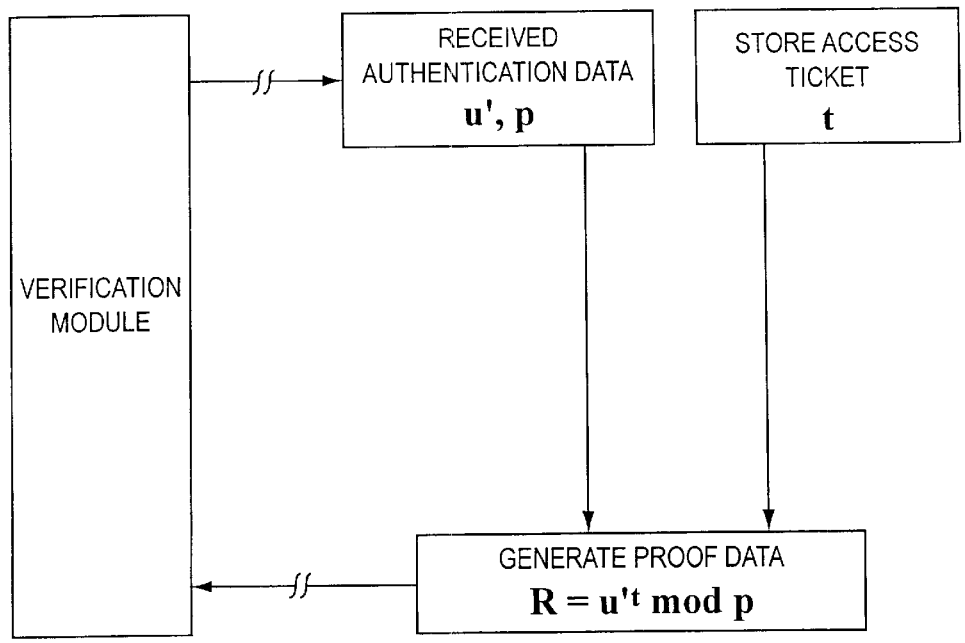
FIG. 23 is a chart showing the operation of a proof data generation module in the seventh and eighth embodiments described above.

The overall configuration of this embodiment is shown in FIG. 2. The configuration of the proof data verification module 10 is shown in FIG. 5, and the configuration of the proof data generation module 11 is shown in FIG. 7. The operation of the proof data verification module 10 of this embodiment is shown in FIG. 14 and the operation of the proof data generation module 11 is shown in FIG. 23.

Hereinafter, the operation of this embodiment will be described.

1. By a user's accessing, the proof data verification module 10 is activated.

2. The proof data verification module 10 stores authentication data u' and the modulus p stored in the access ticket public key memory unit 101 into the received authentication data memory unit 121 in the proof data generation module 11. The seed for authentication data memory unit 108 stores u as a seed for authentication data and the authentication data memory unit 109 stores authentication data C.

The proof data verification module 10 generates a random number r by the random number generation unit 102 and stores it in the random number memory unit 103.

Next, the randomize unit 107 obtains the data u stored in the seed for authentication data memory unit 107 and computes authentication data u' by an expression 7-1.
[Expression 53]

$$u'=u^r \bmod p \tag{7-1}$$

3. The proof data generation unit 124 in the proof data generation module 11 obtains the access ticket t stored in the access ticket memory unit 125 and executes an expression 7-2 under the modulus p stored in the received authentication data memory unit 121, and obtains R.
[Expression 54]

$$R=u'^t \bmod p \tag{7-2}$$

4. The proof data generation module 11 returns R to the received proof data memory unit 110 of the proof data verification module 10.

5. The exponent generation unit 113 in the proof data verification module 10 obtains the user unique identifying information e stored in the user unique identifying information memory unit 112 and the modulus p stored in the access ticket public key memory unit 101, and executes an expression 7-3.
[Expression 55]

$$F(e, p) \tag{7-3}$$

6. The verification computation unit 104 in the proof data verification module 10 obtains the modulus p from the access ticket public key memory unit 101, and the seed for authentication data u from the seed for authentication data memory unit 108, and executes an expression 7-4.
[Expression 56]

$$S=u'^{F(e,p)} \bmod p \tag{7-4}$$

7. Further, the verification computation unit 104 in the proof data verification module 10 obtains the proof data R stored in the received proof data memory unit 110, and executes an expression 7-5 to obtain R'.
[Expression 57]

$$R'=SR \bmod p \tag{7-5}$$

8. The derandomize unit 105 in the proof data verification module 10 retrieves the random number r generated previously from the random number memory unit 103, and executes an expression 7-6.
[Expression 58]

$$v=R'^A \bmod p, \text{ where } A=(r^{-1} \bmod(p-1)) \tag{7-6}$$

Next, an expression 7-7 is executed using v obtained from the computation and C stored in the authentication data memory unit.
[Expression 59]

$$K'=C \cdot v^{-1} \bmod p \tag{7-7}$$

9. Only when the combination of the access ticket t used in the proof data verification module 10 with the user unique identifying information e is correct, K' obtained from the computation and the verification data K match and verification is performed correctly.

Eighth Embodiment

Next, an eighth embodiment of the invention will be described. This embodiment is a variation of the seventh embodiment.

This embodiment is the same as the second embodiment with respect to the method for forming ElGamal public key cipher, the method for generating an access ticket t, a seed for authentication data u, and authentication data C, and the conditions of t, u, and C to be satisfied.

Figure 15:
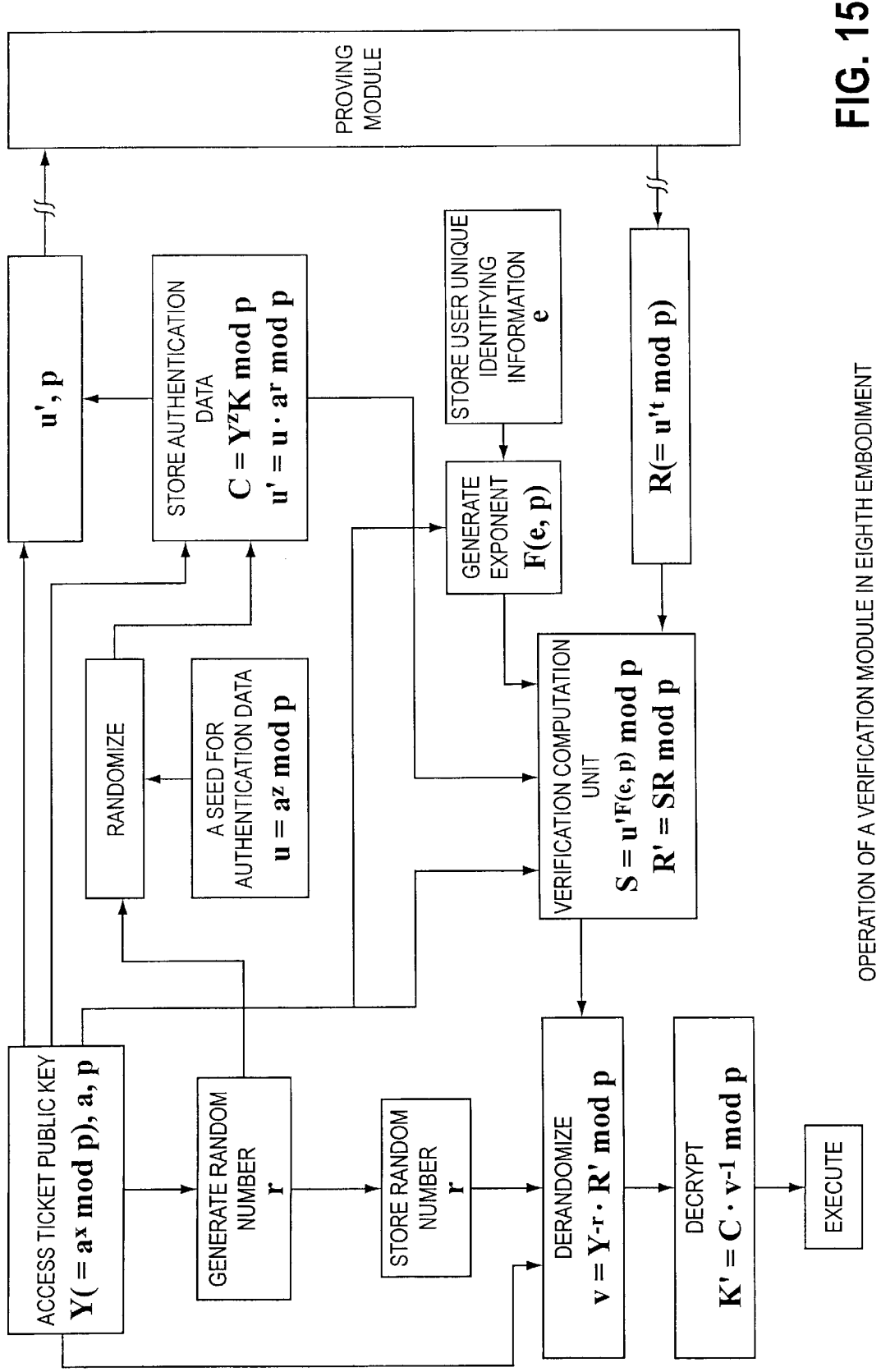
FIG. 15 is a chart showing the operation of a proof data verification module in the eighth embodiment described above.

The overall configuration of this embodiment is shown in FIG. 2. The configuration of the proof data verification module 10 is shown in FIG. 5, and the configuration of the proof data generation module 11 is shown in FIG. 7. The operation of the proof data verification module 10 of this embodiment is shown in FIG. 15 and the operation of the proof data generation module 11 is shown in FIG. 23.

Hereinafter, the operation of this embodiment will be described.

1. By a user's accessing, the proof data verification module 10 is activated.

2. The proof data verification module 10 stores authentication data u' and the modulus p stored in the access ticket public key memory unit 101 into the received authentication data memory unit 121 in the proof data generation module 11. The seed for authentication data memory unit 108 stores u as a seed for authentication data, and the authentication data memory unit 109 stores authentication data C.

The proof data verification module 10 generates by the random number generation unit 102 a random number r and stores it in the random number memory unit 103.

Next, the randomize unit 107 obtains the data u stored in the seed for authentication data memory unit 108 and computes authentication data u' with an expression 8-1.

[Expression 60]

$$u' = u \cdot a^r \bmod p \quad (8\text{-}1)$$

3. The proof data generation unit 124 in the proof data generation module 11 obtains the access ticket t stored in the access ticket memory unit 25 and executes an expression 8-2 to obtain R under the modulus p stored in the received authentication data memory unit 121.
[Expression 61]

$$R = u'^t \bmod p \quad (8\text{-}2)$$

4. The proof data generation module 11 returns R to the received proof data memory unit 110 of the proof data verification module 10.

5. The exponent generation unit 113 in the proof data verification module 10 obtains the user unique identifying information e stored in the user unique identifying information memory unit 112 and the modulus p stored in the access ticket public key memory unit 101, and executes an expression 8-3.
[Expression 62]

$$F(e, p) \quad (8\text{-}3)$$

6. The verification computation unit 104 in the proof data verification module 10 obtains the modulus p from the access ticket public key memory unit 101 and the authentication data u' from the authentication data memory unit 109, and executes an expression 8-4.
[Expression 63]

$$S = u'^{F(e,p)} \bmod p \quad (8\text{-}4)$$

7. Further, the verification computation unit 104 in the proof data verification module 10 obtains the proof data R stored in the received proof data memory unit 110, and executes an expression 8-5 to obtain R'.
[Expression 64]

$$R' = SR \bmod p \quad (8\text{-}5)$$

8. The derandomize unit 105 in the proof data verification module 10 retrieves the random number r generated previously from the random number memory unit 103, and executes an expression 8-6.
[Expression 65]

$$v = Y^{-r} \cdot R' \bmod p \quad (8\text{-}6)$$

Next, an expression 8-7 is executed using v obtained from the computation and C stored in the authentication data memory unit 109.
[Expression 66]

$$K' = C \cdot v^{-1} \bmod p \quad (8\text{-}7)$$

9. Only when the combination of the access ticket t used in the proof data verification module 10 with the user unique identifying information e is correct, K' obtained from the computation and the verification data K match and verification is performed correctly.

Ninth Embodiment

Next, a ninth embodiment of the invention will be described. This embodiment is also a variation of the seventh embodiment. This embodiment is also the same as the second embodiment with respect to the method for forming ElGamal public key cipher, the method for generating an access ticket t, a seed for authentication data u, and authentication data C, and the conditions of t, u, and C to be satisfied.

Figure 16:
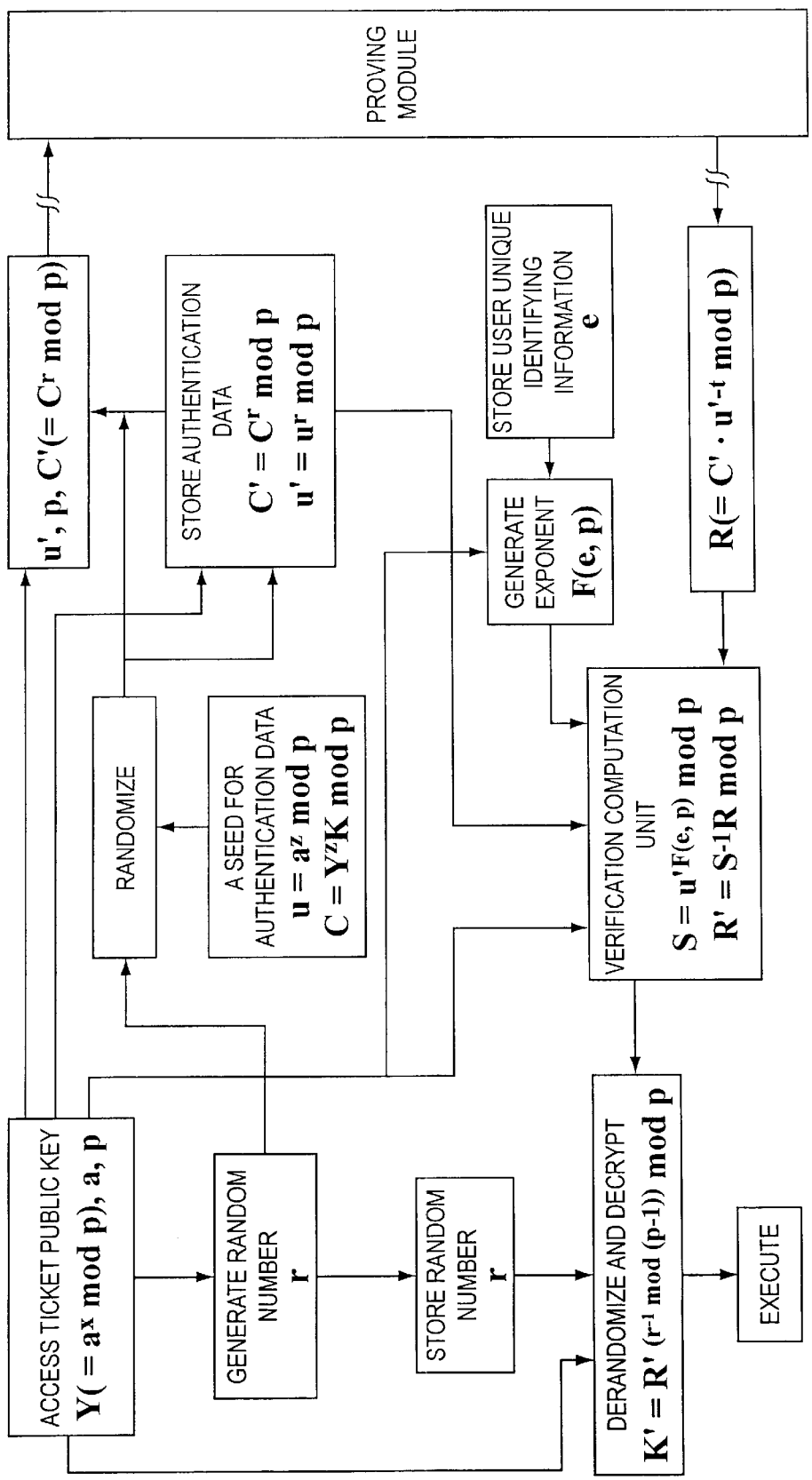
FIG. 16 is a chart showing the operation of a proof data verification module in the ninth embodiment described above.
Figure 24:
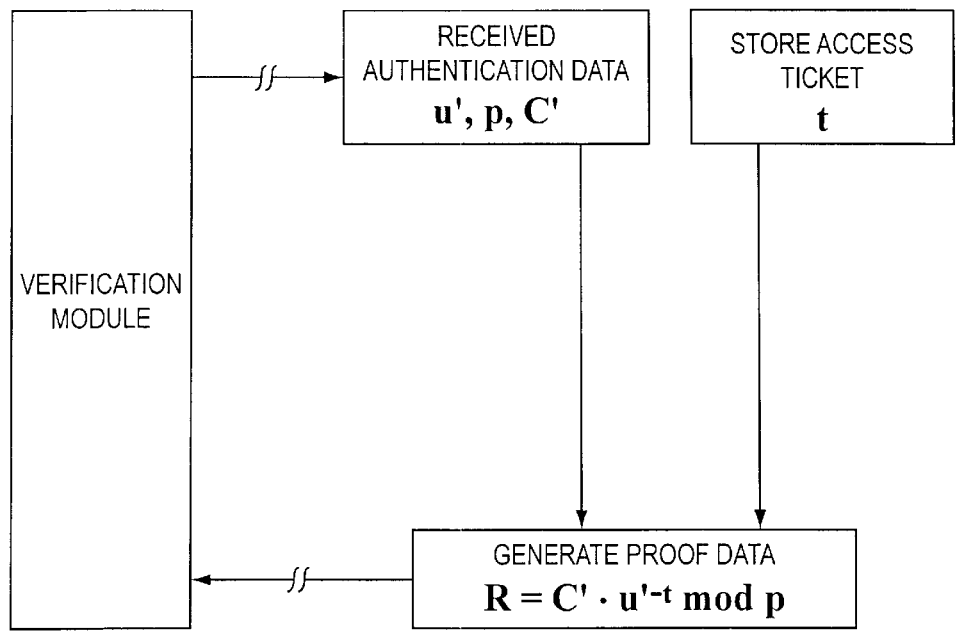
FIG. 24 is a chart showing the operation of a proof data generation module in the ninth embodiment described above.

The overall configuration of this embodiment is shown in FIG. 2. The configuration of the proof data verification module 10 is shown in FIG. 5, and the configuration of the proof data generation module 11 is shown in FIG. 7. The operation of the proof data verification module 10 of this embodiment is shown in FIG. 16 and the operation of the proof data generation module 11 is shown in FIG. 24.

Hereinafter, the operation of this embodiment will be described.

1. By a user's accessing, the proof data verification module 10 is activated.

2. The proof data verification module 10 stores authentication data u' and C' and the modulus p stored in the access ticket public key memory unit 101 in the received authentication data memory unit 121 in the proof data generation module 11. The seed for authentication data memory unit 108 stores u and C as a seed for authentication data.

The proof data verification module 10 generates by the random number generation unit 102 a random number r which is prime to the modulus p held in the access ticket public key memory unit 101 minus 1 (p−1), and stores it in the random number memory unit 103.

Next, the randomize unit 107 obtains the data u stored in the seed for authentication data memory unit 108 and computes authentication data u' by an expression 9-1.
[Expression 67]

$$u' = u^r \bmod p \quad (9\text{-}1)$$

Further, the randomize unit 107 obtains the data C stored in the seed for authentication data memory unit 108 and executes an expression 9-2.
[Expression 68]

$$C' = C^r \bmod p \quad (9\text{-}2)$$

3. The proof data generation unit 124 in the proof data generation module 11 obtains the access ticket t stored in the access ticket memory unit 125 and executes an expression 9-3 to obtain R under the modulus p stored in the received authentication data memory unit 121.
[Expression 69]

$$R = C' \cdot u'^{-t} \bmod p \quad (9\text{-}3)$$

4. The proof data generation module 11 returns R to the received proof data memory unit 110 of the proof data verification module 10.

5. The exponent generation unit 113 in the proof data verification module 10 obtains the user unique identifying information e stored in the user unique identifying information memory unit 112 and the modulus p stored in the access ticket public key memory unit 101, and executes an expression 9-4.
[Expression 70]

$$F(e, p) \quad (9\text{-}4)$$

6. The verification computation unit 104 in the proof data verification module 10 obtains the modulus p from the access ticket public key memory unit 101 and the authentication data u' from the authentication data memory unit 109, and executes an expression 9-5.
[Expression 71]

$$s = u'^{F(e,p)} \bmod p \quad (9\text{-}5)$$

7. Further, the verification computation unit 104 in the proof data verification module 10 obtains the proof data R stored in the received proof data memory unit 110, and executes an expression 9-6 to obtain R'.
[Expression 72]

$$R'=S^{-1}R \bmod p \qquad (9\text{-}6)$$

8. The derandomize unit 105 in the proof data verification module 10 retrieves the random number r generated previously from the random number memory unit 103, and executes an expression 9-7.
[Expression 73]

$$K'=R'^A \bmod p, \text{ where } A=(r^{-1} \bmod (p-1))$$

9. Only when the combination of the access ticket t used in the proof data verification module 10 with the user unique identifying information e is correct, K' obtained from the computation and the verification data K match and verification is performed correctly.

Tenth Embodiment

Next, a tenth embodiment of the invention will be described. This embodiment is also a variation of the seventh embodiment. This embodiment is also the same as the second embodiment with respect to the method for forming ElGamal public key cipher, the method for generating an access ticket t, a seed for authentication data u, and authentication data C, and the conditions of t, u, and C to be satisfied.

Figure 17:
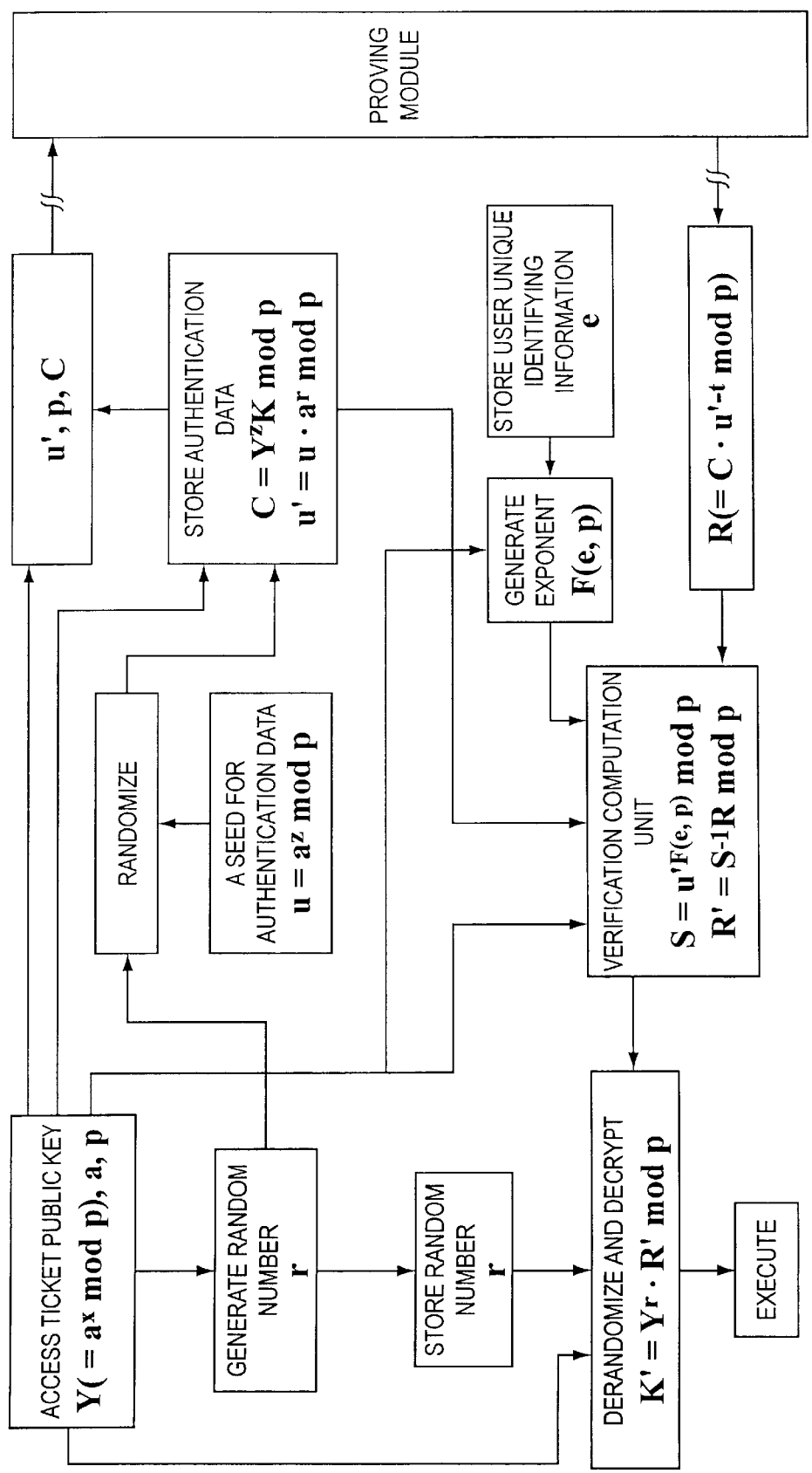
FIG. 17 is a chart showing the operation of a proof data verification module in the tenth embodiment described above.
Figure 25:
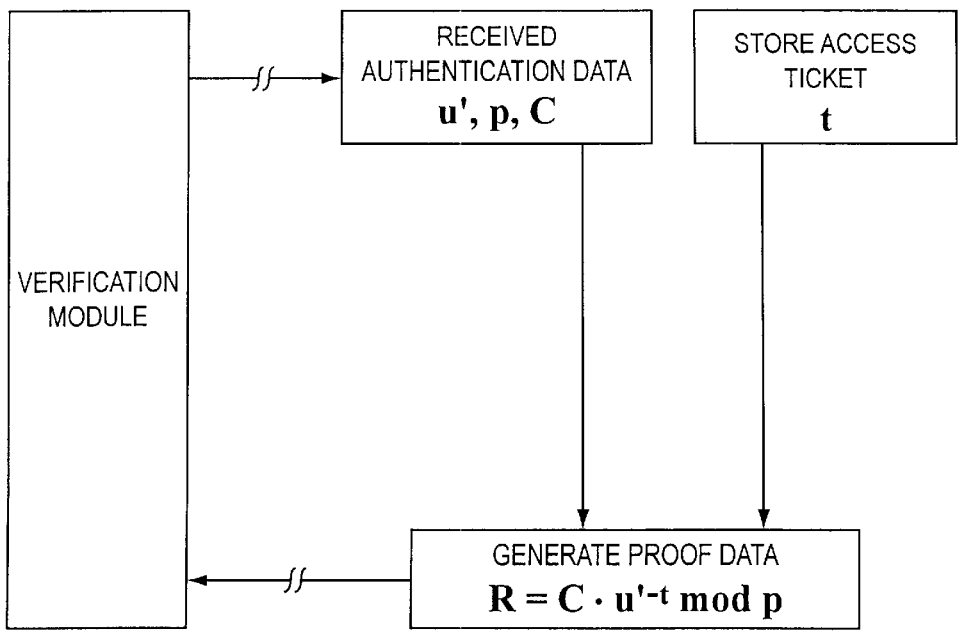
FIG. 25 is a chart showing the operation of a proof data generation module in the tenth embodiment described above.

The overall configuration of this embodiment is shown in FIG. 2. The configuration of the proof data verification module 10 is shown in FIG. 5, and the configuration of the proof data generation module 11 is shown in FIG. 7. The operation of the proof data verification module 10 of this embodiment is shown in FIG. 17 and the operation of the proof data generation module 11 is shown in FIG. 25.

Hereinafter, the operation of this embodiment will be described.

1. By a user's accessing, the proof data verification module 10 is activated.

2. The proof data verification module 10 stores authentication data u' and C' and the modulus p stored in the access ticket public key memory unit 101 into the received authentication data memory unit 121 in the proof data generation module 11. The seed for authentication data memory unit 108 stores u as a seed for authentication data, and the authentication data memory unit 109 stores the authentication data C.

The proof data verification module 10 generates by the random number generation unit 102 a random number and stores it in the random number memory unit 103.

Next, the randomize unit 107 obtains the data u stored in the seed for authentication data memory unit 108 and computes authentication data u' by an expression 10-1.
[Expression 74]

$$u'=u \cdot a^r \bmod p \qquad (10\text{-}1)$$

3. The proof generation unit 124 in the proof data generation module 11 obtains the access ticket t stored in the access ticket memory unit 125 and executes an expression 10-2 to obtain R under the modulus p stored in the received authentication data memory unit 121.
[Expression 75]

$$R=C \cdot u'^{-t} \bmod p \qquad (10\text{-}2)$$

4. The proof data generation module 11 returns R to the received proof data memory unit 110 of the proof data verification module 10.

5. The exponent generation unit 113 in the proof data verification module 10 obtains the user unique identifying information e stored in the user unique identifying information memory unit 112 and the modulus p stored in the access ticket public key memory unit 101, and executes an expression 10-3.
[Expression 76]

$$F(e, p) \qquad (10\text{-}3)$$

6. The verification computation unit 104 in the proof data verification module 10 obtains the modulus p from the access ticket public key memory unit 101 and the authentication data u' from the authentication data memory unit 109, and executes an expression 10-4.
[Expression 77]

$$R=u'^{F(e,p)} \bmod p \qquad (10\text{-}4)$$

7. Further, the verification computation unit 104 in the proof data verification module 10 obtains the proof data R stored in the received proof data memory unit 110, and executes an expression 10-5 to obtain R'.
[Expression 78]

$$R'=S^{-1}R \bmod p \qquad (10\text{-}5)$$

8. The derandomize unit 105 in the proof data verification module 10 retrieves the random number r generated previously from the random number memory unit 103, and executes an expression 10-6.
[Expression 79]

$$K'=Y^r \cdot R' \bmod p \qquad (10\text{-}6)$$

9. Only when the combination of the access ticket t used in the proof data verification module 10 and the user unique identifying information e is correct, K' obtained from the computation and the verification data K match and verification is performed correctly.

Eleventh Embodiment

Next, an eleventh embodiment of the invention will be described. In this embodiment, users are authenticated by use of access tickets without generating proof data.

The configuration of this embodiment is shown in FIG. 3. An example of the configuration of a verification module of this embodiment is shown in FIG. 26 and its operation is shown in FIG. 27.

Figure 26:
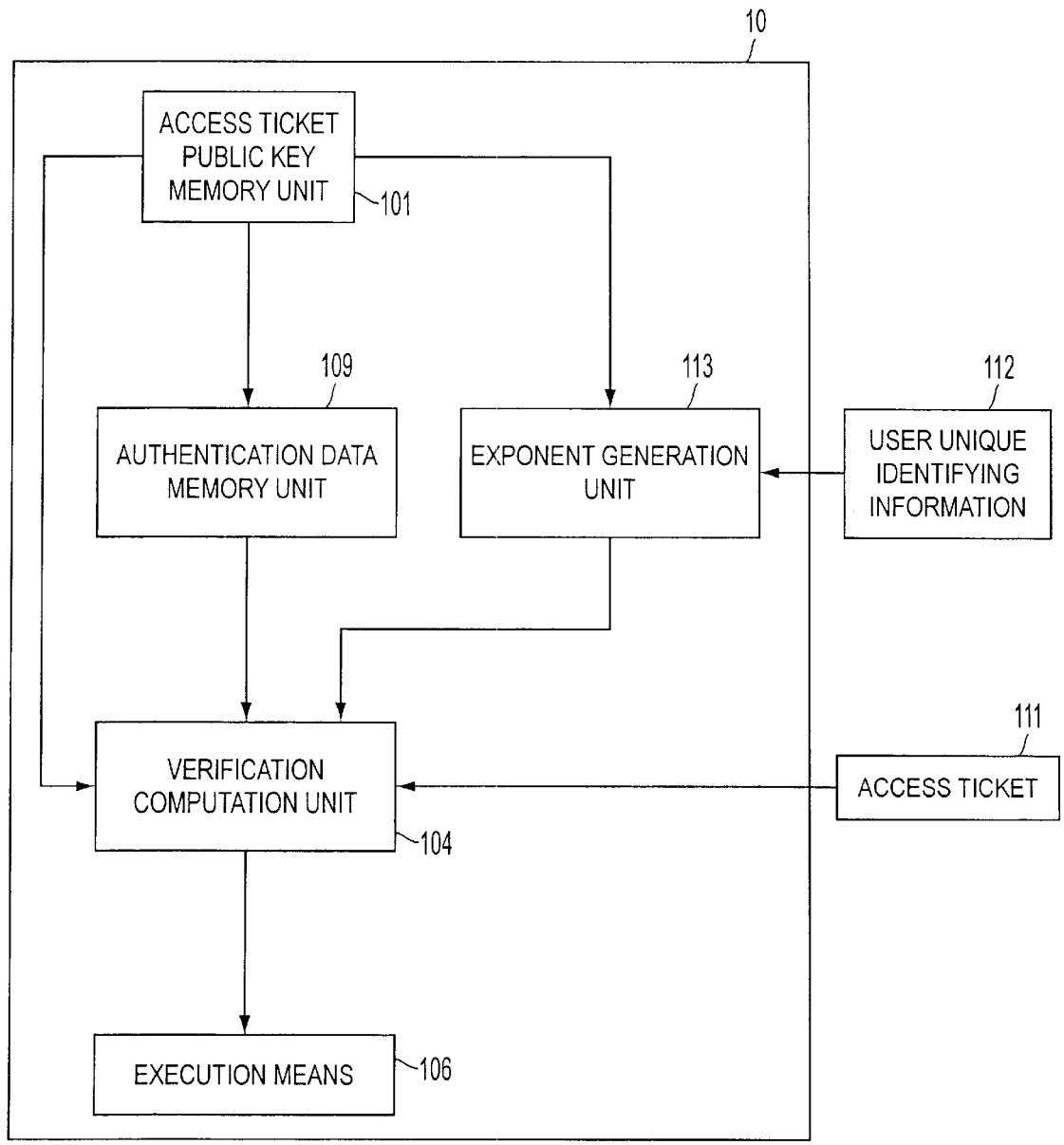
FIG. 26 is a chart showing the configuration of a verification module in the eleventh embodiment described above.
Figure 27:
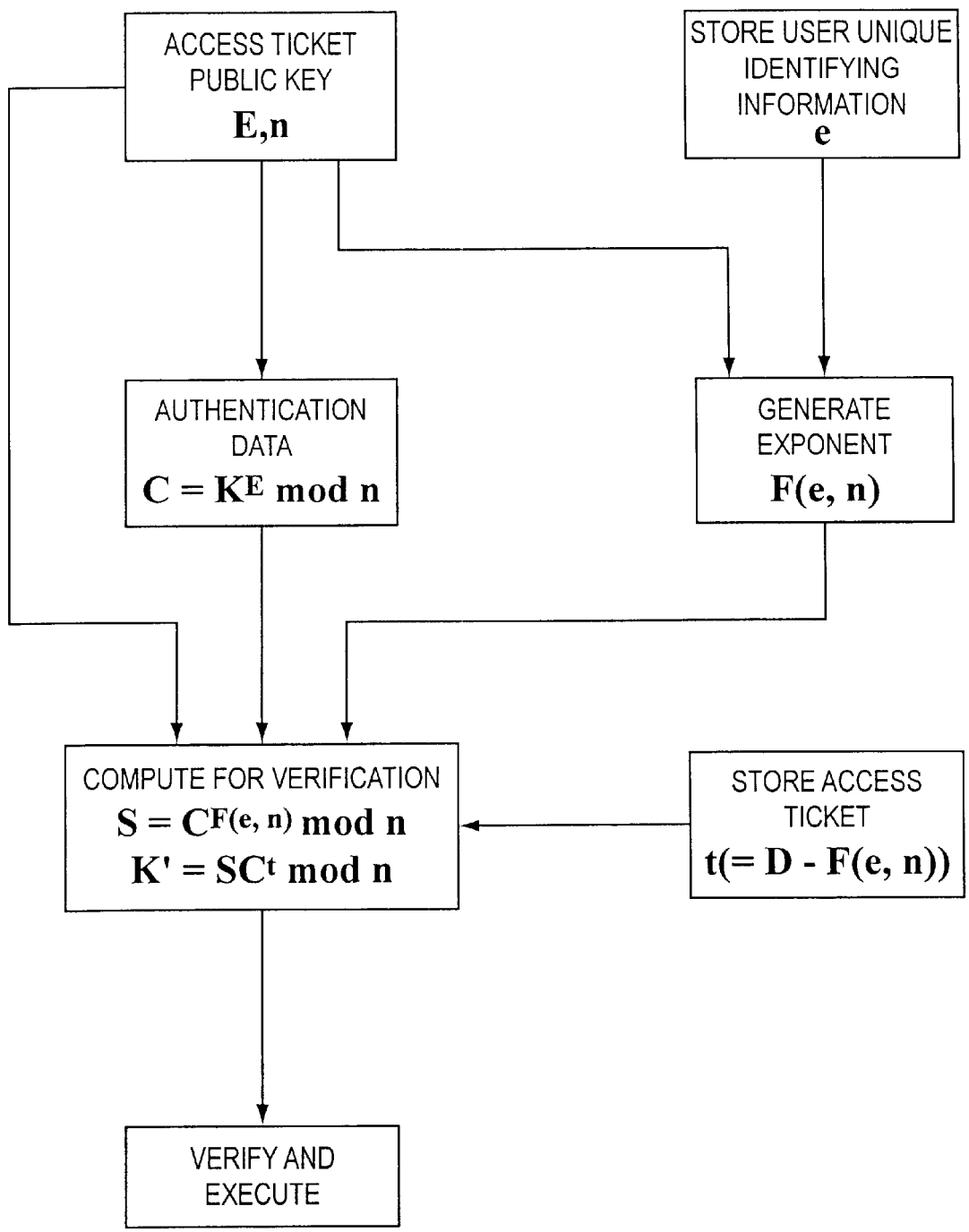
FIG. 27 is a chart showing the operation of a verification module in the eleventh embodiment described above.

In FIG. 26, the verification 10 comprises an access ticket public key memory unit 101, a verification computation unit 104, an execution unit 106, an authentication data memory unit 109, and an exponent computation unit 113. Inputs to the verification module 10 include access tickets and user unique identifying information from the access ticket memory unit 111 and the user unique identifying information memory unit 112, respectively.

Hereinafter, this embodiment will be described in detail.

In the eleventh embodiment of the invention, access rights authentication characteristic information D, public information E and n corresponding to D, and user unique identifying information e are afforded in the same way as in the first embodiment. Like the first embodiment, D is referred to as an access ticket private key and E as an access ticket public key.

An access ticket t is generated in combination with access rights authentication characteristic information D and user unique identifying information e. As in other embodiments, the access ticket is generated based on an expression 11-1 using the function F and the modulus n.
[Expression 80]

$$t=D-F(e, n) \tag{11-1}$$

The access ticket may also be generated like an expression 11-2.
[Expression 81]

$$t=\text{Encrypt}(D, e) \tag{11-2}$$

Here, Encrypt (x, y) denotes that x is encrypted by y. In this case, the user unique identifying information e is a secret key of symmetric key cipher and the access ticket t is an equivalent of the access rights authentication characteristic information D which is encrypted by the user unique identifying information e. Alternatively, with e used as a private key of public key cipher and a public key as d, x may be encrypted by d as shown by an expression 11-3.
[Expression 82]

$$t=\text{Encrypt}(D, d) \tag{11-3}$$

Next, the operation of this embodiment will be described in detail.

1. By a user's accessing, the verification module 10 is activated.

2. As authentication data, C is stored in the authentication data memory unit 109 of the verification module 10. Here, when verification data is selected as proper data K, the authentication data C satisfies an expression 11-4 for the data K.
[Expression 83]

$$C = K^E \bmod n \tag{11-4}$$

3. When an access ticket is computed based on the expression 11-1, the exponent generation unit 113 of the verification module 10 obtains the user unique identifying information e stored in the user unique identifying information memory unit 112 and the modulus n stored in the access ticket public key memory unit 101, and executes an expression 11-5.
[Expression 84]

$$F(e, n) \tag{11-5}$$

4. The verification computation unit 104 of the verification module 10 executes an expression 11-6 using the data generated in the exponent generation unit 113, and obtains S.
[Expression 85]

$$S=C^{F(e,n)} \bmod n \tag{11-16}$$

5. Further, the verification computation unit 104 of the verification module 10 obtains the access ticket t stored in the access ticket memory unit 111, and executes an expression 11-7 under the modulus n stored in the access ticket public key memory unit 101 and obtains K'.
[Expression 86]

$$K'=SC^t \bmod n \tag{11-7}$$

6. Only when the combination of the access ticket t given to the verification module 10 with the user unique identifying information e is correct, K' obtained from the computation and the verification data K match and verification is performed correctly.

If the access ticket is based on the expression 11-2 or 11-3, the above steps 3, 4, and 5 are not executed and the following steps 3' and 4' are executed.

3'. The verification computation unit 104 of the verification module 10 executes an expression 11-8. Here, Decrypt (x, y) denotes that x is decrypted by a key y.
[Expression 87]

$$\text{Decrypt}(t, e) \tag{11-8}$$

4'. Further, the verification computation unit 104 of the verification module 10 executes an expression 11-9 and obtains K'.
[Expression 88]

$$K'=C^{\text{Decrypt}(t,e)} \bmod n \tag{11-9}$$

As is apparent from the above description, according to the present invention, by introducing proof support information (access tickets), access rights authentication characteristics information and user unique identifying information can be made independent of each other, and therefore both protectors and users have only to prepare one piece of unique information. An access ticket is computed based on the user unique identifying information and the access rights authentication characteristic information, and without knowing the user unique identifying information, it is difficult to compute the access rights authentication characteristic information from the access ticket. Correct proof data is computed only when a correct combination of user unique identifying information with an access ticket, namely the combination of the user unique identifying information with an access ticket computed based on the user unique identifying information, is inputted. Accordingly, user's access rights can be authenticated in terms of execution control and the like in such a way that the user holds user unique identifying information in advance and protectors such as program authors prepare access rights authentication characteristic information independent of the user unique identifying information held by the user and create and distribute an access ticket in accordance with the user unique identifying information and the access rights authentication characteristic information used in the creation of the application program.

DESCRIPTION OF THE REFERENCE NUMERALS

10 Proof data verification module (verification module)
11 Proof data generation module
12 Access ticket generation module
13 Verification means
14 Proof data
15 Access ticket
16 Proof data generation means
17 User unique identifying information
101 Access ticket public key memory unit
102 Random number generation unit
103 Random number memory unit
104 Verification computation unit
105 Derandomize unit
106 Execution means
107 Randomize unit 108 A seed for authentication data memory unit
109 Authentication data memory unit
110 Received proof data memory unit
111 Access ticket memory unit
112 User unique identifying information memory unit
113 Exponent generation unit
121 Received authentication data memory unit
122 User unique identifying information memory unit
123 Exponent generation unit
124 Proof data generation unit
125 Access ticket memory unit

What is claimed is:

1. An access rights authentication apparatus authenticating user's access rights by verifying the legitimacy of proof data generated to prove the access rights of said user, comprising:

first memory means for storing authentication data;

second memory means for storing user unique identifying information;

third memory means for storing proof support information obtained by execution of a predetermined computation on said user unique identifying information and access rights authentication characteristic information; proof data generation means for generating proof data by performing predetermined computations on said authentication data held in said first memory means and said user unique identifying information held in said second memory means;

and proof data verification means for verifying that said proof data is generated based on said user unique identifying information, wherein said proof data verification means includes computation means for performing predetermined computations on the proof data generated by the proof data generation means and said proof support information held in said third memory means, the computation result of said computation means being used for verification;

wherein said access rights authentication characteristic information is used as a decryption key in an encryption function and said authentication data is an equivalent of proper data which is encrypted using an encryption key corresponding to said decryption key, and wherein said proof data verification means verifies that a computation result by said computation means is an equivalent of said authentication data which is correctly decrypted.

2. The access rights authentication apparatus according to claim 1, wherein at least said second memory means and said proof data generation means are housed in a protection means which makes it difficult for internal data and processing procedure thereof to be observed from the outside.

3. The access rights authentication apparatus according to claim 1, wherein at least said second memory means and said proof data generation means are configured as a portable small-size computing device such as IC cards.

4. The access rights authentication apparatus according to claim 1, wherein said proof support information stored in said third memory means is created only from said access rights authentication characteristic information and said user unique identifying information.

5. The access rights authentication apparatus according to claim 1, wherein said proof support information stored in said third memory means is created from said access rights authentication characteristic information, said user unique identifying information, and public information corresponding to said access rights authentication characteristic information.

6. The access rights authentication apparatus according to claim 1, wherein said proof support information t stored in said third memory means is created from a value obtained from the execution of a non-collision function with said user unique identifying information e as an input and said access rights authentication characteristic information.

7. The access rights authentication apparatus according to claim 1, wherein said proof support information t stored in said third memory means is created from a value obtained from the execution of a non-collision function with said user unique identifying information e and public information corresponding to said access rights authentication characteristic information as inputs, and said access rights authentication characteristic information.

8. The access rights authentication apparatus according to claim 1 which includes fourth memory means for storing second authentication data, wherein said computation means of said proof data verification means performs computations using said second authentication data stored in said fourth memory means.

9. The access rights authentication apparatus according to claim 1 which includes: fifth memory means for storing a seed for authentication data; and sixth memory means for storing random numbers generated by a random number generation means, wherein said random number generation means stores a generated random number in said sixth memory means and applies randomization to said seed for authentication data stored in said fifth memory means by use of said random number, and then stores the result in said first memory means as said authentication data.

10. The access rights authentication apparatus according to claim 1 which includes: fifth memory means for storing a seed for authentication data; and sixth memory means for storing random numbers generated by said random number generation means, wherein said random number generation means stores a generated random number in said sixth memory means and stores a pair of a value resulting from the application of randomization to said seed for authentication data stored in said fifth memory means by use of said random number and said second authentication data stored in said fourth memory means or a value resulting from the application of randomization to said second authentication data by use of said random number in said first memory means as said authentication data.

11. The access rights authentication apparatus according to claim 9, wherein said proof data verification means removes randomization by said random number stored in said sixth memory means from said proof data generated by said proof data generation means.

12. The access rights authentication apparatus according to claim 1, wherein said access rights authentication characteristic information is used as an encryption key of an encryption function, and wherein said proof data verification means, including random number generation means which stores a generated random number in said first memory means as said authentication data, verifies that a computation result by said computation means is an equivalent of the authentication data used as said random number which is encrypted by the encryption key, which is said access rights authentication characteristic information.

13. The access rights authentication apparatus according to claim 12, wherein said encryption function is an asymmetric key encryption function and said access rights authentication characteristic information is one of the keys.

14. The access rights authentication apparatus according to claim 13, wherein said encryption function is a public key encryption function and said access rights authentication characteristic information is a private key.

15. The access rights authentication apparatus according to claim 12, wherein said encryption function is a symmetric key encryption function and said access rights authentication characteristic information is a common secret key.

16. The access rights authentication apparatus according to claim 12, wherein, when said encryption function is an RSA public key cipher under a modulus n, said access rights authentication characteristic information is a private key D, and a public key corresponding to said private key D is E, then said proof data verification means, in said computation means, raises the product of the t-th power (t is said proof support information) of said authentication data C stored in said fifth memory means under said modulus n, multiplied by said proof data R generated by said proof data generation means, to the E-th power (E is said public key) under said modulus n, and verifies that the result and said authentication data C stored in said fifth memory means are the same under said modulus n.

17. The access rights authentication apparatus according to claim 13, wherein, when said encryption function performs a modular exponentiation operation under a predetermined modulus and exponent, and access rights authentication characteristic information is a decryption key of said encryption function, then the authentication data stored in said first memory means is an equivalent of data K which is encrypted by said encryption function, and said proof data verification means, in said computation means, multiples the t-th power (t is said proof support information) of the authentication data C stored in said fifth memory means under said modulus n, by said proof data R generated by said proof data generation means, and verifies that the result and said K are the same under said modulus.

18. The access rights authentication apparatus according to claim 8, wherein said second authentication data is an equivalent of proper data which is encrypted using an encryption key corresponding to said decryption key, and said proof data verification means authenticates that the result of computations by said computation means is an equivalent of said second authentication data which is correctly decrypted by a decryption key corresponding to said encryption key, which is access rights authentication characteristic information.

19. The access rights authentication apparatus according to claim 13, wherein, when said encryption function is a public key cipher under a modulus p and a positive integer a, access rights authentication characteristic information is a private key X, a public key corresponding to the private key X is Y ($Y=a^x$ mod p), u is the z-th power of said a (z is a proper random number) under the modulus p, and C is the result of execution of a predetermined computation between the z-th power of said Y (z is above random number) under the modulus p and the data K, then u is stored as authentication data in said first memory means, C is stored in said fourth memory means, and wherein said proof data verification means multiplies, in said computation means, the t-th power of said u (t is proof support information) by proof data R generated by said proof data generation means to generate a value R' under the modulus p, and performs a predetermined computation on C stored in said fourth memory means and said R', and verifies that the result and said K are the same under the modulus p.

20. The access rights authentication apparatus according to claim 13, wherein, when said encryption function is a public key cipher under a modulus p and a positive integer a, access rights authentication characteristic information is another key X, a public key corresponding to the key X is Y ($Y=a^x$ mod p), u is the z-th power of said a (z is a proper random number) under the modulus p, and C is the product of the z-th power of said Y (z is above random number) under the modulus p multiplied by the data K ($C=Y^zK$ mod p), then u is stored as a seed for authentication data in said fifth memory means, C is stored in said fourth memory means, and a pair of u and C is stored as authentication data in said first memory means, and wherein said proof data verification means divides, in said computation means, proof data R generated by said proof data generation means by the t-th power of said u (t is proof support information) under the modulus p, and verifies that the result, said R', and said K are the same under the modulus p.

21. The access rights authentication apparatus according to claim 16, wherein proof support information t stored in said third memory means is data resulting from subtracting said user unique identifying information e from access rights authentication characteristic information, and said proof data generation means computes the e-th power of C under a modulus corresponding to said access rights authentication characteristic information from said e, and authentication data C stored in said first memory means.

22. The access rights authentication apparatus according to claim 16, wherein proof support information t stored in said third memory means is data resulting from subtracting a positive integer f from access rights authentication characteristic information, said positive integer f being generated as the result of a predetermined computation on said user unique identifying information e and public information corresponding to said access rights authentication characteristic information, and said proof data generation means computes the f-th power of C under a modulus corresponding to said access rights authentication characteristic information from said e and authentication data C stored in said first memory means.

23. The access rights authentication apparatus according to claim 1 which authenticates user's access rights by mutual communications between a proof data generation module comprising at least said first memory means; said second memory means; and said proof data generation means, and a proof data verification module including at least said proof data verification means, and further comprising said third memory means; seventh memory means for storing authentication data; and eighth memory means for storing proof data, wherein said proof data verification module stores authentication data stored in said seventh memory means in said first memory means of said proof data generation module, wherein said proof data generation module stores proof data in said eighth memory means of said proof data verification module, said proof data being generated based on said authentication data stored in said first memory means by said proof data generation means, and wherein said proof data verification module authenticates user's access rights using said proof data stored in said eighth memory means.

24. An access rights authentication apparatus authenticating user's access rights by verifying the correctness of proof data generated to prove the access rights of said user, comprising:

first memory means for storing authentication data;
second memory means for storing user unique identifying information;

third memory means for storing proof support information obtained by execution of a predetermined computation on said user unique identifying information and said access rights authentication characteristic information;

proof data generation means for generating proof data by performing predetermined computations on said authentication data held in said first memory means and said proof support information held in said third memory means;

and proof data verification means for verifying that said proof data is generated based on said proof support information, including computation means for performing predetermined computations on the proof data generated by the proof data generation means and said user unique identifying information held in said second memory means, wherein the computation result of said computation means is used for verification;

wherein said access rights authentication characteristic information is used as a decryption key in an encryption function and said authentication data is an equivalent of proper data which is encrypted using an encryption key corresponding to said decryption key, and wherein said proof data verification means verifies that a computation result by said computation means is an equivalent of said authentication data which is correctly decrypted.

25. The access rights authentication apparatus according to claim 24, wherein said proof support information stored in said third memory means is created from said access rights authentication characteristic information and said user unique identifying information.

26. The access rights authentication apparatus according to claim 24, wherein said proof support information stored in said third memory means is created from said access rights authentication characteristic information, said user unique identifying information, and public information corresponding to said access rights authentication characteristic information.

27. The access rights authentication apparatus according to claim 24, wherein said proof support information t stored in said third memory means is created from a value obtained from the execution of a non-collision function with said user unique identifying information e as an input, and said access rights authentication characteristic information.

28. The access rights authentication apparatus according to claim 24, wherein said proof support information t stored in said third memory means is created from a value obtained from the execution of a non-collision function with said user unique identifying information e and public information corresponding to said access rights authentication characteristic information as inputs, and said access rights authentication characteristic information.

29. The access rights authentication apparatus according to claim 24 which includes fourth memory means for storing second authentication data, wherein a computation means of said proof data verification means performs computations using said second authentication data stored in said fourth memory means.

30. The access rights authentication apparatus according to claim 24 which includes fifth memory means for storing a seed for authentication data and sixth memory means for storing random numbers generated by a random number generation means, wherein said random number generation means stores a generated random number in said sixth memory means and applies randomization to said seed for authentication data stored in said fifth memory means by use of said random number, and then stores the result in said first memory means as said seed for authentication data.

31. The access rights authentication apparatus according to claim 24 which includes fifth memory means for storing a seed for authentication data and sixth memory means for storing random numbers generated by said random number generation means, wherein said random number generation means stores a generated random number in said sixth memory means and stores a pair of a value resulting from the application of randomization to said seed for authentication data stored in said fifth memory means by use of said random number and said second authentication data stored in said fourth memory means or a value resulting from the application of randomization to said second authentication data by use of said random number in said first memory means as said authentication data.

32. The access rights authentication apparatus according to claim 30, wherein said proof data verification means removes randomization by said random number stored in said sixth memory means from said proof data generated by said proof data generation means.

33. The access rights authentication apparatus according to claim 24, wherein said access rights authentication characteristic information is used as an encryption key of an encryption function, and wherein said proof data verification means, including random number generation means which stores a generated random number in said first memory means as said authentication data, verifies that a computation result by said computation means is an equivalent of the authentication data used as said random number which is encrypted by the encryption key, which is said access rights authentication characteristic information.

34. The access rights authentication apparatus according to claim 24, wherein said encryption function is a public key encryption function and said access rights authentication characteristic information is a private key.

35. The access rights authentication apparatus according to claim 33, wherein said encryption function is a symmetric key encryption function and said access rights authentication characteristic information is a common secret key.

36. The access rights authentication apparatus according to claim 29, wherein said second authentication data is an equivalent of proper data which is encrypted using an encryption key corresponding to said decryption key, and said proof data verification means authenticates that the result of computations by said computation means is an equivalent of said second authentication data which is correctly decrypted by a decryption key corresponding to said encryption key, which is access rights authentication characteristic information.

37. The access rights authentication apparatus according to claim 33, wherein, when said encryption function is an RSA public key cipher under a modulus n, access rights authentication characteristic information is a private key D, and a public key corresponding to said private key D is E, then said proof data verification means, in said computation means, raises the authentication data C stored in said fifth memory means to the f-th power to obtain a value C' under the modulus n, the f being a positive integer generated by a predetermined computation on said user unique identifying information e, raises the product of said C' and proof data R generated by said public key E and said proof data generation means to the E-th power (E is said public key) under the modulus n, and verifies that the result and the authentication data C stored in said fifth memory means are the same under the modulus n ($R^E C'^E \mod n = C \mod n$).

38. The access rights authentication apparatus according to claim 35, wherein, when said encryption function is an RSA public key cipher under a modulus n and performs a modular exponentiation under a predetermined modulus and exponent, and access rights authentication characteristic information is a decryption key of said encryption function, then the authentication data stored in said first memory means is an equivalent of data K which is encrypted by said encryption function, and wherein said proof data verification means multiples, in said computation means, the f-th power of the authentication data C stored in said fifth memory means under said modulus n (where the f is a positive integer generated by executing a predetermined computation on said user unique identifying information e) by the proof data R generated by said proof data generation means, and verifies that the result and said K are the same under the modulus n.

39. The access rights authentication apparatus according to claim 35, wherein, when said encryption function is a public key cipher under a modulus p and a positive integer a, access rights authentication characteristic information is one of the keys X, a public key corresponding to the key X is Y ($Y=a^x$ mod p), u is the z-th power of said a (z is a proper random number) under the modulus p, and C is the result of execution of a predetermined computation between the z-th power of said Y (z is above random number) under the modulus p and the data K, then u is stored as authentication data in said first memory means, C is stored in said fourth memory means, and wherein said proof data verification means multiples, in said computation means, the f-th power of said u (where the f is a positive integer generated by executing a predetermined computation on said user unique identifying information e) under the modulus p by proof data R generated by said proof data generation means to generate a value R', and performs a predetermined computation on C stored in said fourth memory means and said R', and verifies that the result and said K are the same under the modulus p.

40. The access rights authentication apparatus according to claim 24, wherein, when said encryption function is a public key cipher under a modulus p and a positive integer a, access rights authentication characteristic information is one of the keys X, a public key corresponding to the key X is Y ($Y=a^x$ mod p), u is the z-th power of said a (z is a proper random number) under the modulus p, and C is the product of the z-th power of said Y (z is above random number) under the modulus p multiplied by the data K ($C=Y^zK$ mod p), then u is stored as a seed for authentication data in said fifth memory means, C is stored in said fourth memory means, and a pair of u and C is stored as authentication data in said first memory means, and wherein said proof data verification means divides, in said computation means, the proof data R generated by said proof data generation means by the f-th power of said u (where the f is a positive integer generated by executing a predetermined computation on said user unique identifying information e) under the modulus p, and verifies that the result, said R', and said K are the same under the modulus p.

41. The access rights authentication apparatus according to claim 36, wherein said proof data generation means raises C to the t-th power under a modulus corresponding to said access rights authentication characteristic information from said e, the proof support information t stored in said third memory means, and the authentication data C stored in said first memory means.

42. The access rights authentication apparatus according to claim 24 which authenticates user's access rights by mutual communications between a proof data generation module comprising at least said first memory means; said third memory means; and said proof data generation means, and a proof data verification module including at least said proof data verification means, and further comprising said second memory means; seventh memory means for storing authentication data; and eighth memory means for storing proof data, wherein said proof data verification module stores said authentication data stored in said seventh memory means in said first memory means of said proof data generation module, wherein said proof data generation module stores proof data in said eighth memory means of said proof data verification module, said proof data being generated based on said authentication data stored in said first memory means by said proof data generation means, and wherein said proof data verification module authenticates user's access rights using said proof data stored in said eighth memory means.

43. The access rights authentication apparatus according to claim 1, wherein said proof data verification means includes ninth memory means for storing plaintext data corresponding to said authentication data or said seed for authentication data which is encrypted, and comparison means, which compares the result of a predetermined computation on said proof data generated by said proof data generation means with the plaintext data stored in said ninth memory means, and determines that said proof data is valid only when both match.

44. The access rights authentication apparatus according to claim 1, wherein said proof data verification means includes redundancy verification means for verifying data redundancy and determines that said proof data generated by said proof data generation means is valid when it is determined by the redundancy verification means that the value of said proof data or a value obtained by a computation on said proof data has a specific redundancy.

45. The access rights authentication apparatus according to claim 1, wherein said proof data verification means includes: tenth memory means for storing the result of execution of a predetermined one-way function on plaintext data corresponding to said authentication data or said seed for authentication data which is encrypted; one-way function value generation means for executing said one-way function; and said comparison means, wherein the one-way function value generation means performs a predetermined computation on said proof data generated by said data generation means before executing the one-way function, and said comparison means compares the result of execution of said one-way function with data stored in said tenth memory means, and determines that said proof data is valid only when both match.

46. The access rights authentication apparatus according to claim 1, wherein said proof data verification means includes program execution means, said authentication data or said seed for authentication data is data obtained by encrypting a program, and said proof data verification means passes values obtained by executing a predetermined computation on said proof data generated by the proof data generation means to the program execution means as part or all of the program, whereby the program execution means operates correctly only when the proof data generation means correctly decrypts said authentication data or seed for authentication data, which is an encrypted program, namely, when the encrypted program is correctly decrypted.

47. The access rights authentication apparatus according to claim 1, wherein said proof data verification means further includes program execution means, program memory means, and program decryption means, wherein part or all of a program stored in the program memory means is encrypted and said authentication data or said seed for authentication data is data obtained by newly encrypting a decryption key for decrypting said encrypted program, and wherein said proof data verification means passes said proof data generated by said proof data generation means to said program decryption means, and said program decryption means decrypts part or all of the program stored in said program memory means using as a decryption key a value obtained by executing a predetermined computation on the proof data generated by said proof data generation means and said proof support information, and said program execution means executes a decrypted program, whereby the program execution means operates correctly only when said proof data generation means correctly decrypts said authentication data or seed for authentication data, namely, when the decryption key is correctly decrypted to decrypt the encrypted program.

48. An access rights authentication apparatus authenticating user's access rights, including:

first memory means for storing authentication data;

second memory means for storing user unique identifying information;

third memory means for storing proof support information resulting from execution of a predetermined computation on said user unique identifying information and access rights authentication characteristic information; and verification means for verifying that a pair of said proof support information and said user unique identifying information corresponds correctly to said access rights authentication characteristic information from said authentication data, said user unique identifying information, and said proof support information, wherein said proof support information stored in said third memory means is created from a value obtained from the execution of a non-collision function with said user unique identifying information and public information corresponding to said access rights authentication characteristic information as inputs, and said access rights authentication characteristic information.

49. The access rights authentication apparatus according to claim 48, wherein said proof support information stored in said third memory means is created from said access rights authentication characteristic information, said user unique identifying information, and public information corresponding to said access rights authentication characteristic information.

50. The access rights authentication apparatus according to claim 48, wherein said proof support information t stored in said third memory means is created from a value obtained from the execution of a non-collision function with said user unique identifying information e as an input, and said access rights authentication characteristic information.

51. The access rights authentication apparatus according to claim 48 which includes fourth memory means for storing second authentication data, wherein said predetermined computation means performs computations using said second authentication data stored in said fourth memory means.

* * * * *